(12) United States Patent  (10) Patent No.: US 6,887,603 B2
Kasahara et al.  (45) Date of Patent: May 3, 2005

(54) RAW FUEL VAPORIZING APPARATUS, METHOD OF VAPORIZING RAW FUEL, AND FUEL CELL SYSTEM EQUIPPED WITH RAW FUEL VAPORIZING APPARATUS

(75) Inventors: Kiyoshi Kasahara, Saitama (JP); Yuuji Asano, Saitama (JP); Satoshi Hanai, Saitama (JP); Takahiro Tachihara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 157 days.

(21) Appl. No.: 10/143,835

(22) Filed: May 14, 2002

(65) Prior Publication Data

US 2002/0170504 A1 Nov. 21, 2002

(30) Foreign Application Priority Data

May 15, 2001 (JP) ......................................... 2001-144299

(51) Int. Cl.⁷ ........................... H01M 8/04; H01M 8/06; F24H 1/00; F23N 5/00
(52) U.S. Cl. ............................. 429/17; 429/20; 429/24; 429/26; 122/4 D; 122/23; 431/12; 431/75
(58) Field of Search ............................. 429/17, 19, 20, 429/22, 24, 26; 122/4 D, 23, 24, 25; 431/2, 5, 12, 18, 75

(56) References Cited

U.S. PATENT DOCUMENTS 4,687,491 A * 8/1987 Latty ...................... 122/4 D X 5,476,375 A * 12/1995 Khinkis et al. ................. 431/7
5,567,390 A * 10/1996 Cleary ........................ 431/5 X
6,497,199 B2 * 12/2002 Yamada et al. ......... 122/4 D X
6,627,342 B1 * 9/2003 Nakamura et al. ............. 429/26
6,706,434 B2 * 3/2004 Takamura ..................... 429/22

FOREIGN PATENT DOCUMENTS

| JP | 2000-319002 | 11/2000 | ............ H01M/8/06 |
| JP | 2000-323161 | 11/2000 | ............ H01M/8/04 |
| JP | 2001-296017 | 10/2001 | ............ H01M/8/04 |

* cited by examiner

*Primary Examiner*—Stephen J. Kalafut
(74) *Attorney, Agent, or Firm*—Arent Fox, PLLC

(57) ABSTRACT

A raw fuel vaporizing apparatus comprising: a vaporizer for vaporizing liquid raw fuel; a raw fuel introducing device for introducing the liquid raw fuel into the vaporizer; a catalyst combustor into which fuel and air are supplied for catalytic combustion, the catalyst combustor generating heat in the presence of a catalyst and supplying the resulting heat to the vaporizer to vaporize the liquid raw fuel; a fuel introducing device for introducing the fuel into the catalyst combustor; an air introducing device for introducing the amount of the air suitable for catalytic combustion into the catalyst combustor; a heat transferring gas introducing device introducing heat transferring gas into the catalyst combustor to transfer heat retained by the catalyst combustor to the vaporizer; and a controller increasing the amount of the heat transferring gas through the heat transferring gas introducing device when the amount of vapor generated in the vaporizer is increased.

17 Claims, 13 Drawing Sheets

RAW FUEL VAPORIZING APPARATUS, METHOD OF VAPORIZING RAW FUEL, AND FUEL CELL SYSTEM EQUIPPED WITH RAW FUEL VAPORIZING APPARATUS

FIELD OF THE INVENTION

The present invention relates to an improvement in response to produce raw fuel vapor in a raw fuel vaporizing apparatus.

BACKGROUND OF THE INVENTION

In recent years, fuel cell electric vehicles have been drawn attention from a viewpoint of environmental protection, such as for restricting an emission amount of carbon dioxide, which causes the global warming. The fuel cell electric vehicle is furnished with a fuel cell generating electricity by way of electrochemically reacting hydrogen ($H_2$) with oxygen ($O_2$) that is contained in the air so that electricity generated by the fuel cell is supplied to the driving motor to generate a driving force. Furthermore, hydrogen utilizing equipment wherein hydrogen is used as an energy source have been developed, besides fuel cells.

As a hydrogen supplying apparatus for hydrogen utilizing equipment including fuel cells, a fuel reforming system is known, wherein liquid raw fuel such as alcohols and hydrocarbons including methanol and gasoline is vaporized in a vaporizer, and the resulting gas is further reformed in a reformer to produce hydrogen-rich gas. This fuel reforming system has been drawn attention as an apparatus for supplying the fuel cell with fuel gas.

By the way, the vaporizer requires a heat source for vaporizing raw fuel. As a heat source for the vaporizer, for example, a catalyst combustor or a combustion burner is often provided in the fuel cell system for burning exhaust gas (off gas) from the fuel cell, namely, gas mixed by the remaining hydrogen-rich gas fed to the anode pole (hydrogen pole) of the fuel cell and the remaining air fed to the cathode pole (oxygen pole), in the presence of a catalyst.

In such a fuel cell system, when a constant load is applied (during the steady operation), combustion heat quantity for exhaust gas and heat quantity required for vaporizing raw fuel are kept balanced. In other words, the optimum amount of exhaust gas for vaporizing raw fuel is supplied to the catalyst combustor or the combustion burner. However, when the load is shifted from a low load (low power output) to a high load (high power output), increasing a supply of raw fuel does not instantly cause an increment in supply of exhaust gas to the catalyst combustor or the combustion burner because of the lead time due to system volume and the like. Accordingly, the increasing amount of the vapor content of the raw fuel does not instantly supplied to the catalyst combustor or the combustion burner as the increment in the exhaust gas. That is, a delay arises for increasing the introduction of fuel. As a result, since heat quantity supplied to the vaporizer becomes insufficient with respect to the heat quantity required for vaporizing raw fuel, it is impossible to produce in good response raw fuel vapor in accordance with the output.

With the foregoing drawback in view, the following raw fuel vaporizing apparatus with various countermeasures have been proposed.

(1) A raw fuel vaporizing apparatus such as shown in FIG. 12 provided with a heat accumulator in addition to a vaporizer so that the heat accumulator is previously heated to accumulate heat with the use of waste heat and the like, and this previously heated heat accumulator compensates lack of vaporizing heat quantity when the output of the fuel cell system is increased.

(2) A raw fuel vaporizing apparatus wherein heat capacity permitting an expected maximum load variation (from the minimum power output to the maximum power output) is applied to a vaporizer so that the heat capacity of the vaporizer compensates lack of vaporizing heat quantity when the output of the fuel cell system is increased.

(3) A raw fuel vaporizing apparatus such as shown in FIG. 13 provided with a line for supplying a catalyst combustor or a combustion burner, at which exhaust gas is converted into heat, with auxiliary fuel (for example, methanol) that is different from exhaust gas so that a supply of the auxiliary fuel compensates lack of vaporizing heat quantity when the output of the fuel cell system is increased.

However, in the aforementioned raw fuel vaporizing apparatus, the following drawbacks arise.

(1) In the case of employing the heat accumulator, after introducing raw fuel, since the temperature of the heat accumulator (the amount of accumulated heat) decreases with elapse of time, the amount of vapor production decreases, leading to unstableness in the amount of raw fuel vapor. Further, since the response in raw fuel vapor production mostly relies on the weight of the heat accumulator, considering the response seriously results in increased weight of the heat accumulator. As the result, since time during which the heat accumulator accumulates heat becomes longer, the raw fuel vaporizing apparatus is not suitable if the output frequently varies. Furthermore, when considering reduction in weight and size of the equipment, it is not preferable to provide a heat accumulator.

(2) In the case of increasing heat capacity of the vaporizer, the wider the output variation range is, the greater the heat capacity of the vaporizer will be. As the result, the following drawbacks arise.

a. The temperature within the vaporizer has to be retained at high temperatures, leading to restriction in use material and construction from a mechanical point of view as well as extended time for raising the temperature from a physical point of view. Therefore, this raw fuel vaporizing apparatus is not preferable if the output is varied frequently.

b. Increment in weight and size.

Further, since the temperature within the vaporizer (the amount of accumulated heat) decreases with elapse of time, the amount of vapor production decreases, leading to unstableness in the amount of raw fuel vapor.

Furthermore, once the temperature of the vaporizer decreases, it is difficult to raise the temperature to the original temperature. Therefore, if the output is varied frequently, this raw fuel vaporizing apparatus is not preferable.

Accordingly, it is not preferable to increase the heat capacity of the vaporizer thoughtlessly.

(3) In the case of supplying auxiliary fuel, since the heat used for burning auxiliary fuel with the heat capacity of the catalyst burner or the combustion burner is firstly spent for raising the temperature of the catalyst combustor or the combustion burner, all the heat does not instantly and effectively contribute to vaporizing raw fuel. Therefore, merely supplying auxiliary fuel is not sufficient to produce vapor in good response. Further, if the output is varied frequently, the operating efficiency of the raw fuel vaporizing apparatus decreases.

In view of the above, the present invention seeks to provide a raw fuel vaporizing apparatus, a method of vaporizing raw fuel, and a fuel cell system equipped with a raw fuel vaporizing apparatus, wherein raw fuel vapor is produced in good response and stably even when the output is varied from a low power output drive to a high power output drive.

SUMMARY OF THE INVENTION

Raw Fuel Vaporizing Apparatus

According to a first aspect of the invention, there is provided a raw fuel vaporizing apparatus comprising:

a vaporizer for vaporizing liquid raw fuel;

a raw fuel introducing device for introducing the liquid raw fuel into the vaporizer;

a catalyst combustor into which fuel and air are supplied for catalytic combustion, the catalyst combustor generating heat in the presence of a catalyst and supplying the resulting heat to the vaporizer so as to vaporize the liquid raw fuel;

a fuel introducing device for introducing the fuel into the catalyst combustor;

an air introducing device for introducing the amount of the air suitable for catalytic combustion into the catalyst combustor;

a heat transferring gas introducing device introducing heat transferring gas into the catalyst combustor so as to transfer heat retained by the catalyst combustor to the vaporizer; and a controller increasing the amount of the heat transferring gas through the heat transferring gas introducing device when a demand amount of vapor to be generated in the vaporizer is increased.

With such a constitution, fuel and air are supplied to the catalyst combustor for catalytic combustion. As a result, heat is generated. The resulting heat is supplied to the vaporizer so that raw fuel is vaporized into raw fuel vapor. The heat also contributes to raise the temperature of the catalyst combustor. In this circumstance, if the demand amount of vapor to be generated in the vaporizer is increased, the controller increases the amount of the heat transferring gas through the heat transferring gas introducing device. Accordingly, since heat retained in the catalyst combustor is supplied to the vaporizer, it is possible to deal with increased load of the vaporizer (increased demand amount of the raw fuel vapor).

The term "increasing the amount of the heat transferring gas" means both to increase the flow rate of the heat transferring gas that is presently being introduced into the catalyst combustor in a certain amount and to start to introduce heat transferring gas that has not been introduced into the catalyst combustor.

Liquid raw fuel indicates methanol, water/methanol mixture, gasoline, water (hydrogen can be produced from water), etc.

According to a second aspect of the invention, the controller increases the amount of the heat transferring gas through the heat transferring gas introducing device if the increase in the demand amount of vapor is equal to or greater than a predetermined amount.

Herein, the condition "equal to or greater than a predetermined amount" is required for setting a dead zone or a threshold value. With such a constitution, a stable control is achieved.

According to a third aspect of the invention, the controller calculates a demand heat quantity based on a target value of the increased demand amount of vapor, calculates a compulsory heat quantity to be transferred based on the demand heat quantity and a combustion heat quantity of the catalyst combustor, and determines the amount of the heat transferring gas based on the compulsory heat quantity.

With such a constitution, since the amount of the heat transferring gas is determined based on both the heat quantity required for vaporizing raw fuel and the combustion heat quantity of the catalyst combustor, a suitable amount of the heat transferring gas is supplied to the vaporizer. The target value of the increased demand amount of vapor is a target value of the vaporized raw fuel with respect to the vaporizer or the raw fuel vaporizing apparatus. However, this target value of the increased demand amount of vapor may be replaced with various target value relating with the target value of the increased demand amount of vapor or measured values.

According to a fourth aspect of the invention, the controller restricts the introduction of the heat transferring gas through the heat transferring gas introducing device if the amount of the heat transferring gas is more than a predetermined threshold value.

Further, according to a fifth aspect of the invention, the controller restricts the introduction of the heat transferring gas through the heat transferring gas introducing device if a temperature of the catalyst combustor is lower than a catalytic combustion maintaining temperature as a result of the introduction of the heat transferring gas.

For example, when air is introduced as the heat transferring gas, catalytic combustion requires an optimum air-fuel ratio and if the amount of air is too much, the catalytic combustion may be extinguished. The predetermined threshold value with regard to the amount of the heat transferring gas is determined, for example, in consideration of such extinction. Further, the temperature during the catalytic combustion decreases as the amount of air increases, and the catalytic combustion may be extinguished under a certain temperature (catalytic combustion maintaining temperature). For this reason, extinction can be prevented in consideration of the temperature during the catalytic combustion.

According to a sixth aspect of the invention, the controller restricts the introduction of the heat transferring gas in accordance with a purification state by combustion of combustion gas in the catalyst combustor.

Deterioration of the purification state by combustion of the combustion gas (high temperature gas) is not preferable in terms of fuel economy as well as environmental protection. In this constitution, introduction of the heat transferring gas is restricted in accordance with a purification state (purification rate). The purification state of combustion gas can be estimated by way of detecting the temperature or the oxygen content of the combustion gas.

According to a seventh aspect of the invention, the catalyst combustor comprises a honeycomb-shaped carrier on which a catalyst is supported.

With such a constitution of the catalyst combustor, it is possible to achieve stable catalytic combustion without requiring complicated operation. Furthermore, it is easy to provide heat to the heat transferring gas introduced into the catalyst combustor.

According to a eighth aspect of the invention, the air introducing device and the heat transferring gas introducing device are provided by a single device which introduces air as the heat transferring gas.

If the heat transferring gas is air, both the air introducing device and the heat transferring gas introducing device function as means for introducing air into the catalyst combustor. In this aspect, two devices are provided by a single device. In other words, one device has a function to introduce air for catalytic combustion into the catalyst combustor and a function to introduce heat transferring gas into the catalyst combustor. With such a constitution, since a plurality of equipment is commonized, the raw fuel vaporizing apparatus becomes compact in size.

According to a ninth aspect of the invention, the controller restricts the introduction of the heat transferring gas through the heat transferring gas introducing device if a temperature changing value of the catalyst combustor increases positively at the time the fuel introducing device increases the amount of the fuel introduced into the catalyst combustor.

If the amount of the heat transferring gas increases, the retained heat capacity of the catalyst combustor is drawn and the temperature of the catalyst combustor decreases. This heat capacity is given from the catalyst combustor to the vaporizer through the heat transferring gas. Accordingly, notwithstanding that the heat transferring gas draws the retained heat capacity from the catalyst combustor, the temperature changing value of the catalyst combustor increases. This is because the amount of fuel to be introduced into the catalyst combustor increases. When the temperature changing value of the catalyst combustor increases sufficiently, heat quantity that can be given to the vaporizer is ensured without removing the retained heat capacity of the catalyst combustor by the heat transferring gas. For this reason, the introduction of the heat transferring gas into the catalyst combustor is restricted. Herein, the term "restrict" means both to decrease the amount of the heat transferring gas introduced and to stop introducing the heat transferring gas. In the preferred embodiment to be described later, a unit of "temperature changing value" is ° C./sec$^2$.

According to a tenth aspect of the invention, when the heat transferring gas introducing device carries out the introduction of the heat transferring gas, the controller controls the amount of the raw fuel to be introduced into the vaporizer through the raw fuel introducing device such that before an actual amount of raw fuel vapor reaches a target value of the increased demand amount of vapor, the amount of the raw fuel increases more than a requirement determined by the target value.

If the amount of the raw fuel introduced into the vaporizer is increased without consideration of the introduction timing of the heat transferring gas, it may possibly worsen the response, for example, due to liquid pools caused in the vaporizer. For this reason, the introduction of the heat transferring gas and the increase of the raw fuel to be introduced into the vaporizer are carried out in consideration of optimum timings. However, in this instance, even if the amount of the raw fuel to be introduced into the vaporizer is increased so as to satisfy the target value of the demand amount of vapor, the actual amount of raw fuel vapor that is actually produced does not often increase accordingly. In order to cope with this problem, it is necessary to provide the amount of raw fuel to be introduced into the vaporizer more than a requirement.

According to an eleventh aspect of the invention, the controller controls the amount of the raw fuel through the raw fuel introducing device such that after an actual amount of raw fuel vapor reaches a target value of the increased demand amount of vapor and when the target value is retained, the amount of the raw fuel decreases equal to or lower than a requirement determined by the target value.

When the amount of the raw fuel to be introduced into the vaporizer is increased so as to satisfy the demand amount of raw fuel vapor, after reaching the target value, the actual amount of raw fuel vapor is often greater than the demand amount of raw fuel vapor (i.e., overshooting) while the demand amount of raw fuel vapor is being kept. In order to cope with this problem, it is necessary to decrease the amount of the raw fuel to be introduced into the vaporizer.

According to a twelfth aspect of the invention, after an actual amount of raw fuel vapor reaches a target value of the increased demand amount of vapor, the controller receives a signal from a vapor amount measuring device provided downstream of the vaporizer, and controls the amount of the raw fuel to be introduced into the vaporizer through the raw fuel introducing device.

With such a constitution, the amount of vapor is measured after the actual amount of raw fuel vapor reaches the target value of the increased demand amount of vapor. And the amount of the raw fuel to be introduced into the vaporizer is adjusted by input of this measurement signal.

Raw Fuel Vaporizing Method

According to thirteenth aspect of the invention, there is provided a method of vaporizing raw fuel, wherein high temperature gas generated in a catalyst combustor into which fuel and air are introduced for catalytic combustion is introduced into a vaporizer so as to vaporize liquid raw fuel introduced into the vaporizer, the method comprising:

continuously introducing part of or the whole remaining gas vaporized in the vaporizer and reformed but unused in hydrogen utilizing equipment into the catalyst combustor as the fuel; and increasing the amount of the high temperature gas by increasing the amount of the air to be introduced into the catalyst combustor if a load applied to the vaporizer (a demand amount of vapor to be generated in the vaporizer) is increased.

In the case that raw fuel vapor vaporized in the vaporizer is reformed and used in hydrogen utilizing equipment (e.g., fuel cell) and unused remaining gas (discharged gas) is continuously utilized as fuel of the catalyst combustor, if the catalyst combustor requires more fuel, lack of fuel occurs. In other words, fuel is introduced into the catalyst combustor after the steps of vaporization of raw fuel, reformation, and utilization, which causes a time-lag (lead time). And when an increased load is applied to the vaporizer, a delay occurs for increasing the amount of fuel to be introduced into the catalyst combustor against the increased amount of raw fuel introduced into the vaporizer. In this event, since heat quantity introduced (supplied) in the vaporizer is running short (viz., time-lag upon supplying heat quantity), response to produce raw fuel vapor deteriorates.

According to this method, if a load applied to the vaporizer Is increased, the amount of air to be introduced into the catalyst combustor is increased. The introduced air becomes high temperature gas because of heat retained in the catalyst combustor. That is, "high temperature gas" consists of high temperature gas presently generated by catalytic combustion and high temperature gas converted from air because of heat retained in the catalyst combustor. For this reason, the amount of high temperature gas increases by the same amount of air that has been increased, and the high temperature gas is introduced into the vaporizer (the temperature of the catalyst combustor decreases). Accordingly, a time-lag upon supplying the vaporizer with heat quantity is considerably reduced. Since the delayed amount of fuel is additionally introduced into the catalyst combustor, this additional supply of fuel makes up for the shortage of heat quantity, leading to stable vaporization of raw fuel.

The term "load applied to the vaporizer" complies with the target value of the demand amount of vapor as described above. The term "remaining gas" also includes reformed gas that bypasses the hydrogen utilizing equipment and is introduced into the catalyst combustor as fuel gas. Remaining gas hereinafter described in the preferred embodiment is exhaust gas (off gas) discharged from the fuel cell. Further, the term "increasing the amount of the air" means both to increase literally the amount of the air presently introduced into the catalyst combustor at a certain flow rate and to start to introduce air that has not been introduced into the catalyst combustor.

According to a fourteenth aspect of the invention, there is provided a method of vaporizing raw fuel, wherein high temperature gas generated in a catalyst combustor into which fuel and air are supplied for catalytic combustion is introduced into a vaporizer so as to vaporize liquid raw fuel introduced into the vaporizer, the method comprising:

increasing the amount of the high temperature gas by increasing the amount of the air to be introduced into the catalyst combustor when a demand amount of raw fuel vapor to be generated by vaporizing the liquid raw fuel is increased and if increasing the introduction of the fuel into the catalyst combustor is delayed against the increased amount of the raw fuel introduced into the vaporizer.

When a delay occurs for increasing the amount of the fuel to be introduced into the catalyst combustor against the increased amount of raw fuel introduced into the vaporizer, response to produce raw fuel vapor deteriorates.

In this method, likewise the aforementioned technical idea of the raw fuel vaporizing method, a delay in increasing the amount of the fuel introduced into the catalyst combustor upon increasing the demand amount of raw fuel vapor is compensated by increasing the amount of the air to be introduced into the catalyst combustor, and the amount of the high temperature gas to be introduced into the vaporizer is increased.

It is possible to adapt the technical idea appeared in the raw fuel vaporizing apparatus of the first through twelfth aspects of the invention for the aforementioned raw fuel vaporizing methods according to the thirteenth and fourteenth aspects of the invention.

Fuel Cell System with Raw Fuel Vaporizing Apparatus

According to a fifteenth aspect of the invention, there is provided a fuel cell system comprising:

A raw fuel vaporizing apparatus according to the first aspect of this invention;

a reformer supplied with raw fuel vapor generated in the raw fuel vaporizing apparatus and producing hydrogen-rich reformed gas; and a fuel cell supplied with the reformed gas generated in the reformer and air and producing electricity;

wherein the heat transferring gas introducing device also serves as an air supplying device for supplying air to the fuel cell, and the fuel introducing device introduces into the catalyst combustor exhaust gas containing hydrogen discharged from the fuel cell.

Such a fuel cell system comprises a raw fuel vaporizing apparatus according the first aspect of the invention in addition to the reformer and the fuel cell. And the heat transferring gas introducing device serves also as an air supplying device for supplying air to the fuel cell (the air supplying device may serve also as the heat transferring gas introducing device). In the preferred embodiments to be described later, the air compressor as an air supplying device, which supplies air to the cathode of the fuel cell, also serves as the heat transferring gas introducing device for the catalyst combustor. Exhaust gas containing hydrogen that is discharged from the fuel cell is utilized as fuel for the catalyst combustor. Exhaust gas containing hydrogen includes anode exhaust gas, and mixed exhaust gas that is a mixture of cathode exhaust gas with anode exhaust gas.

According to a sixteenth aspect of the invention, the heat transferring gas introducing device introduces into the catalyst combustor exhaust gas discharged from the fuel cell.

In this fuel cell system, exhaust gas is introduced into the catalyst combustor. Exhaust gas discharged from the fuel cell includes cathode exhaust gas that is air discharged from the cathode of the fuel cell (containing oxygen remaining unreacted) and anode exhaust gas that is reformed gas discharged from the anode of the fuel cell (containing hydrogen remaining unreacted), however, the term "exhaust gas" used herein includes cathode exhaust gas as a simple substance and mixed exhaust gas that is a mixture of anode exhaust gas with cathode exhaust gas.

According to a seventeenth aspect of the invention, the controller restricts the amount of the heat transferring gas through the heat transferring gas introducing device if a temperature changing value of the catalyst combustor increases positively at the time a supply of the fuel to the catalyst combustor increases due to the introduction of the exhaust gas.

When the target value of the demand amount of vapor increases, the amount of the heat transferring gas to be introduced into the catalyst combustor is increased, and the temperature of the catalyst combustor decreases. Meanwhile, an increase in the amount of raw fuel vapor, an increase in the amount of reformed gas, and an increase of exhaust gas arise, which lead to an increase in supply of the fuel to the catalyst combustor. At this moment, the catalytic combustion is activated, and a change in the temperature of the catalyst combustor (temperature changing value) changes to an upward trend. When the temperature changing value of the catalyst combustor ($°C./time^2$) changes to an upward trend, a supply of heat to the vaporizer is ensured without increasing the amount of heat transferring gas. Therefore, the amount of the heat transferring gas is restricted. The term "restrict" includes both to decrease the amount and to stop the supply. Furthermore, in the preferred embodiments to be described later, the "temperature changing value" of the catalyst combustor is expressed by $°C./sec^2$.

BRIEF DESCRIPTION OF THE DRAWINGS

Preferred embodiments of the present invention will be described below, by way of example only, with reference to the accompanying drawings, in which.

DESCRIPTION OF THE PREFERRED EMBODIMENTS

Preferred embodiments of a raw fuel vaporizing apparatus, a raw fuel vaporizing method, and a fuel cell system with a raw fuel vaporizing apparatus according to the present invention will be described in detail.

First Embodiment

A fist embodiment of a raw fuel vaporizing apparatus (raw fuel vaporizing method) will be described.

Figure 1:
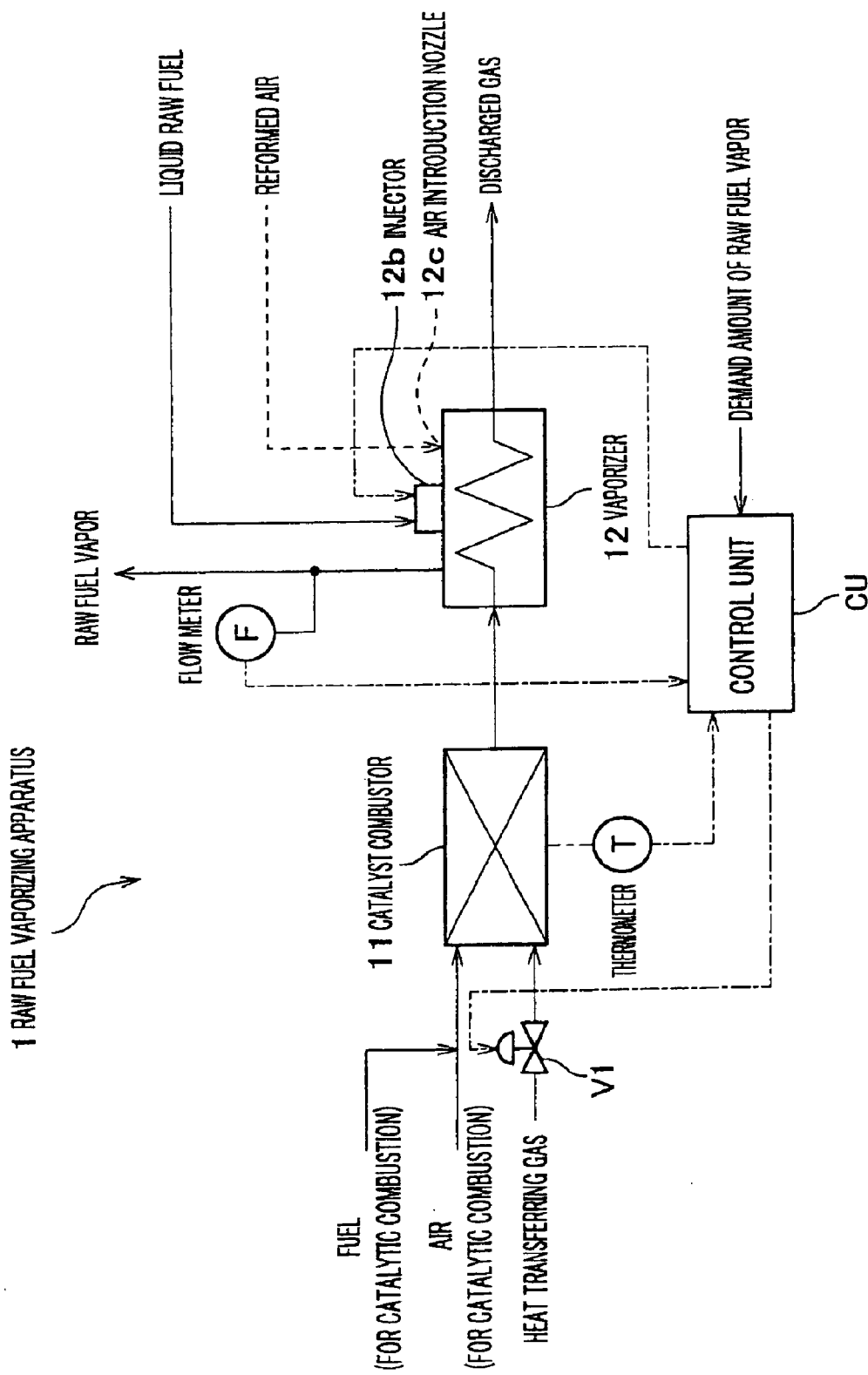
FIG. 1 is a block diagram illustrating a raw fuel vaporizing apparatus according to a first embodiment of the invention.
Figure 2:
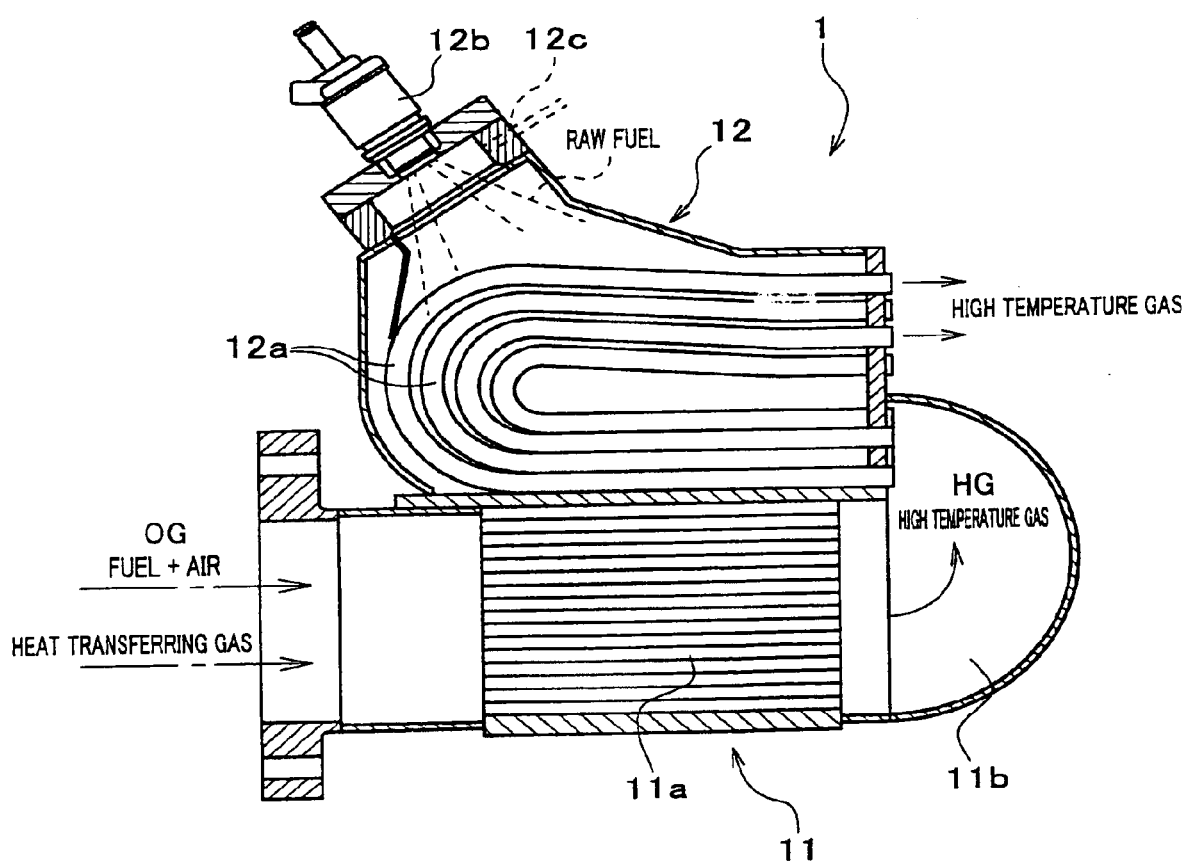
FIG. 2 is a side sectional view of the raw fuel vaporizing apparatus (main body) wherein a catalyst combustor and a vaporizer are combined together.

FIG. 1 is a block diagram illustrating a raw fuel vaporizing apparatus according to the first embodiment of the invention, and FIG. 2 is a side sectional view of the raw fuel vaporizing apparatus (main body) wherein a catalyst combustor and a vaporizer are combined together.

As shown in FIG. 1, a raw fuel vaporizing apparatus 1 produces high temperature gas in a catalyst combustor 11 into which fuel and air for catalytic combustion are introduced and burned in the presence of a catalyst, and vaporizes liquid raw fuel in a vaporizer 12 into which high temperature gas from the catalyst combustor 11 is introduced. Vaporized raw fuel is then supplied to unshown raw fuel utilizing equipment after or without carrying out a certain processing.

Fuel for catalytic combustion (hereinafter referred to as fuel) is supplied to the catalyst combustor 11 through an unshown fuel supplying device (fuel introducing device). Air for catalytic combustion (hereinafter referred to as air) is supplied to the catalyst combustor 11 through an unshown air supplying device (air introducing device). Heat transferring gas (air) is supplied to the catalyst combustor 11 from an unshown heat transferring gas supplying device (heat transferring gas introducing device) via a regulating valve V1. Further, raw fuel is supplied to the vaporizer 12 from an unshown raw fuel supplying device (raw fuel introducing device) through an injector 12b.

Of these, a supply of fuel and air introduced into the catalyst combustor 11 is delayed against introduction of raw fuel into the vaporizer 12 (corresponding to "increasing the introduction of the fuel into the catalyst combustor is delayed" defined in the fourteenth aspect). In other words, if the demand amount of raw fuel vapor is increased, heat quantity required for vaporizing raw fuel in the vaporizer 12 is shortened. According to the first embodiment, the amount of high temperature gas is increased by introducing heat transferring gas into the catalyst combustor 11, thereby compensating the shortage of heat quantity at the vaporizer 12 and producing raw fuel vapor in good response against the demand amount of raw fuel vapor.

The raw fuel vaporizing apparatus 1 according to the first embodiment will be described with reference to FIGS. 1 and 2.

As shown in FIG. 2, in the raw fuel vaporizing apparatus 1, the catalyst combustor 11 is arranged at the bottom and the vaporizer 12 is arranged on top of the catalyst combustor 11.

As seen in FIG. 2, the catalyst combustor 11 is in the form of a box in which is positioned a honeycomb catalyst layer (monolith type catalyst layer) 11a where a catalyst is supported on a honeycomb-shaped carrier having flame resistant characteristics. The catalyst combustor 11 is supplied with mixed gas of fuel (e.g., hydrogen) and air so that the mixed gas is burned in the presence of the catalyst to produce high temperature gas. The term "honeycomb" includes not only hexagonal cross-section but also various cross-sectional shapes such as triangle, square, polygon, circle, oval, corrugation, etc.

The catalyst combustor 11 includes a high temperature gas passage 11b, and high temperature gas produced in the catalyst combustor 11 is introduced into the vaporizer 12 with its flowing direction changed through 180°.

As seen in FIG. 2, the vaporizer 12 is in the form of a box in which is positioned a number of U-shaped heat medium tubes 12a. High temperature gas from the catalyst combustor 11 flows into the heat medium tubes 12a from a lower opening and out from an upper opening, during which the high temperature gas gives heat to the vaporizer 12. The vaporizer 12 is equipped with an injector 12b, which injects liquid raw fuel onto the heat medium tubes 12a within the vaporizer 12. The injector 12b is operated by an injector operating signal such as a PWM (Pulse Width Modulation) signal from a control unit CU. The injector 12b functions to adjust the amount of raw fuel supplied from the unshown raw fuel supplying device and to introduce raw fuel into the interior of the vaporizer 12. Raw fuel vapor vaporized in the vaporizer 12 is led from an unshown vapor outlet provided in a side surface of the vaporizer 12 to unshown raw fuel utilizing equipment (e.g., a fuel cell system where reformed methanol is used as fuel) positioned downstream of the vaporizer 12.

The lower surface of the vaporizer 12 contacts with the upper surface of the catalyst combustor 11. This is to prevent formation of liquid pools as the vaporizer 12 is supplied with heat at its bottom surface due to heat transfer from the catalyst combustor 11.

As shown in FIG. 1, the demand amount of raw fuel vapor is inputted into the control unit CU as the target value of the amount of raw fuel vapor for the raw fuel vaporizing apparatus 1. Further, the flow rate of raw fuel vapor (actual amount of raw fuel vapor) and the interior temperature of the catalyst combustor (temperature of the catalyst) are inputted into the control unit CU from a flow meter F and a thermometer T, respectively. The control unit CU performs processing based on a predetermined control and transmits a valve opening degree signal to the regulating valve V1 which adjusts the amount of heat transferring gas introduced into the catalyst combustor 11. The control unit CU also transmits an injector operating signal to the injector 12b which adjusts the amount of raw fuel introduced into the vaporizer 12.

When the output of the raw fuel vaporizing apparatus 1 changes, a supply of fuel and air to the catalyst combustor 11 increases with a certain delay time (the delay is inevitable) against the increased amount of raw fuel introduced into the vaporizer 12. This certain delay time corresponds to the "delay" appeared in the wording "increasing the introduction of the fuel into the catalyst combustor is delayed" defined in the fourteenth aspect of the invention, and such a delay occurs due to system volume of the raw fuel utilizing equipment.

With reference to the flowcharts of FIGS. 3 through 6, control of the control unit CU will be described. At the same time, manner of operation of the raw fuel vaporizing apparatus 1 will also be described, see FIGS. 1 and 2 when necessary.

Figure 3:
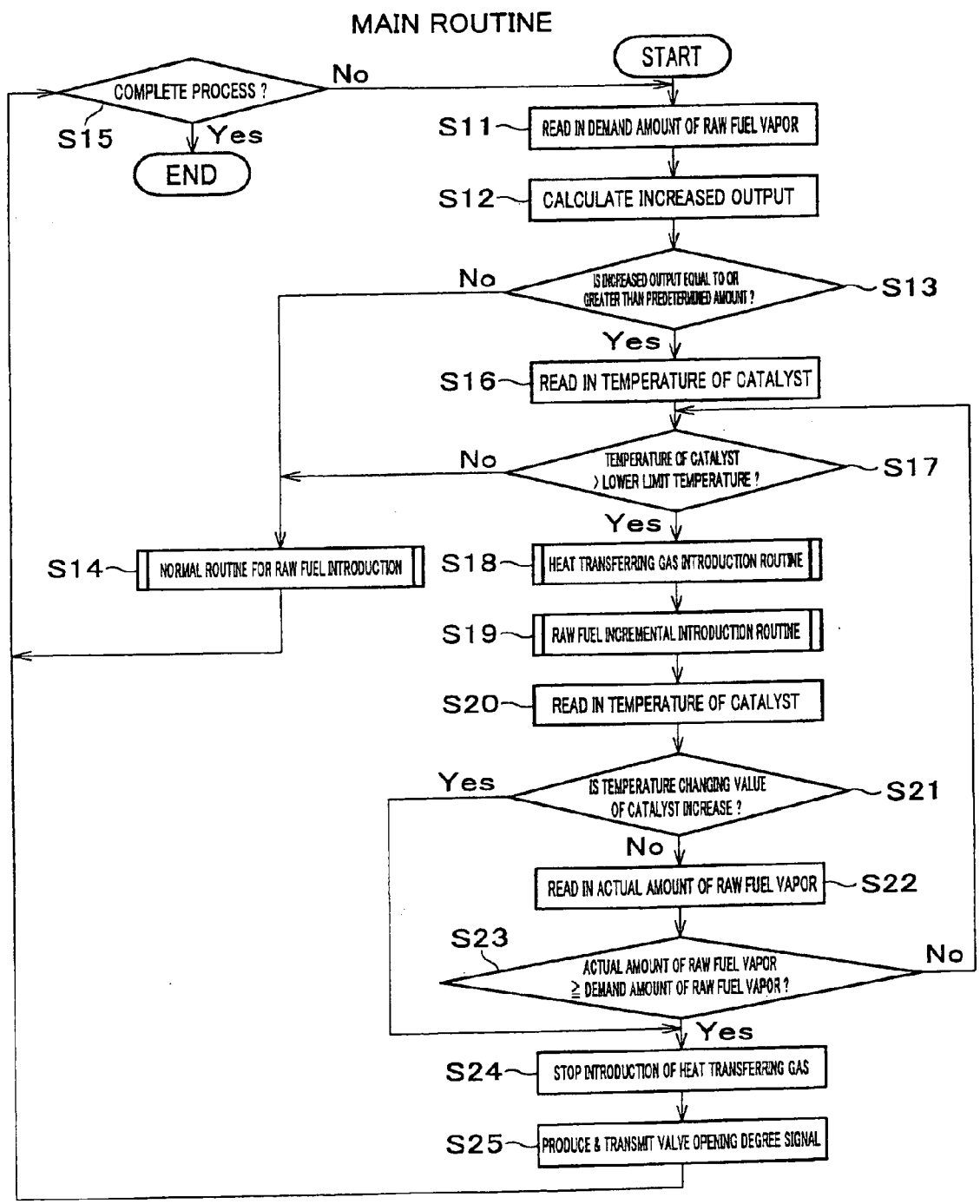
FIG. 3 is a flow chart (main routine) for controlling introduction of raw fuel and introduction of heat transferring gas.
Figure 4:
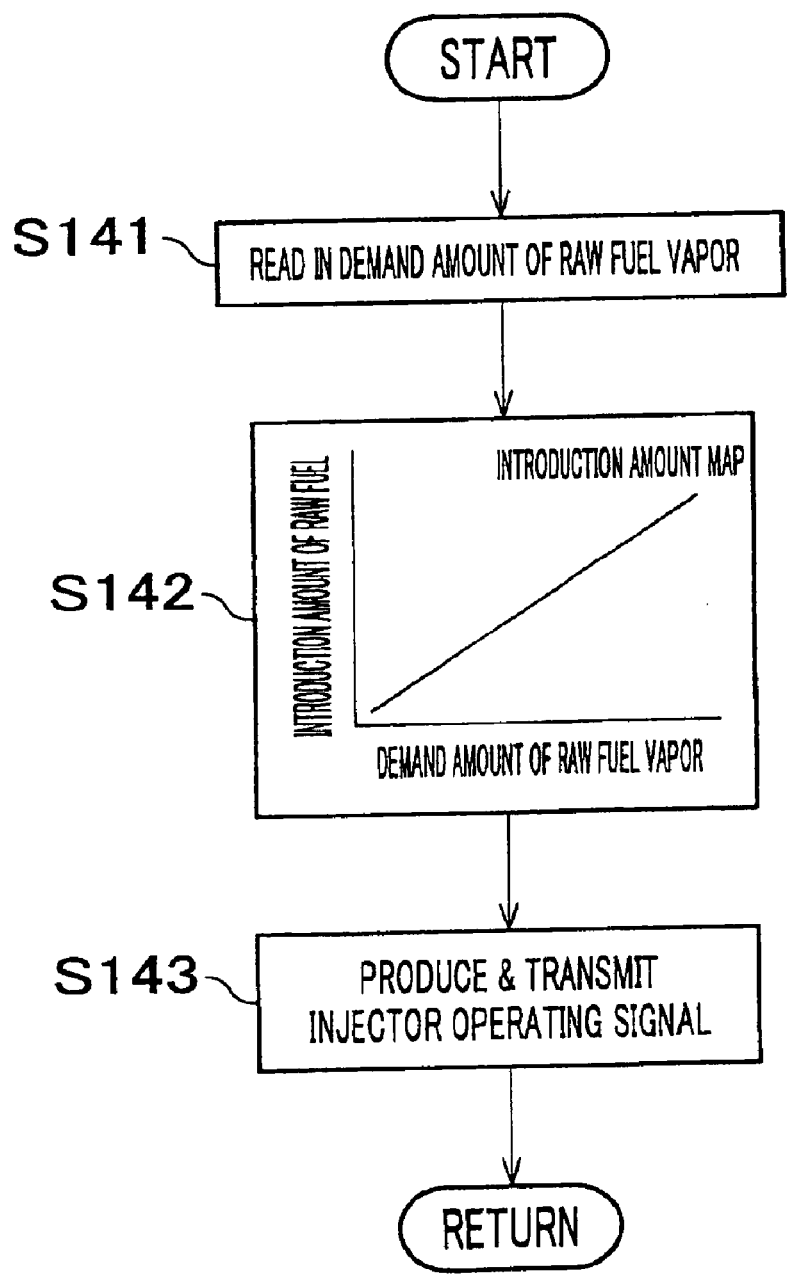
FIG. 4 is a flow chart for controlling introduction of raw fuel.
Figure 5:
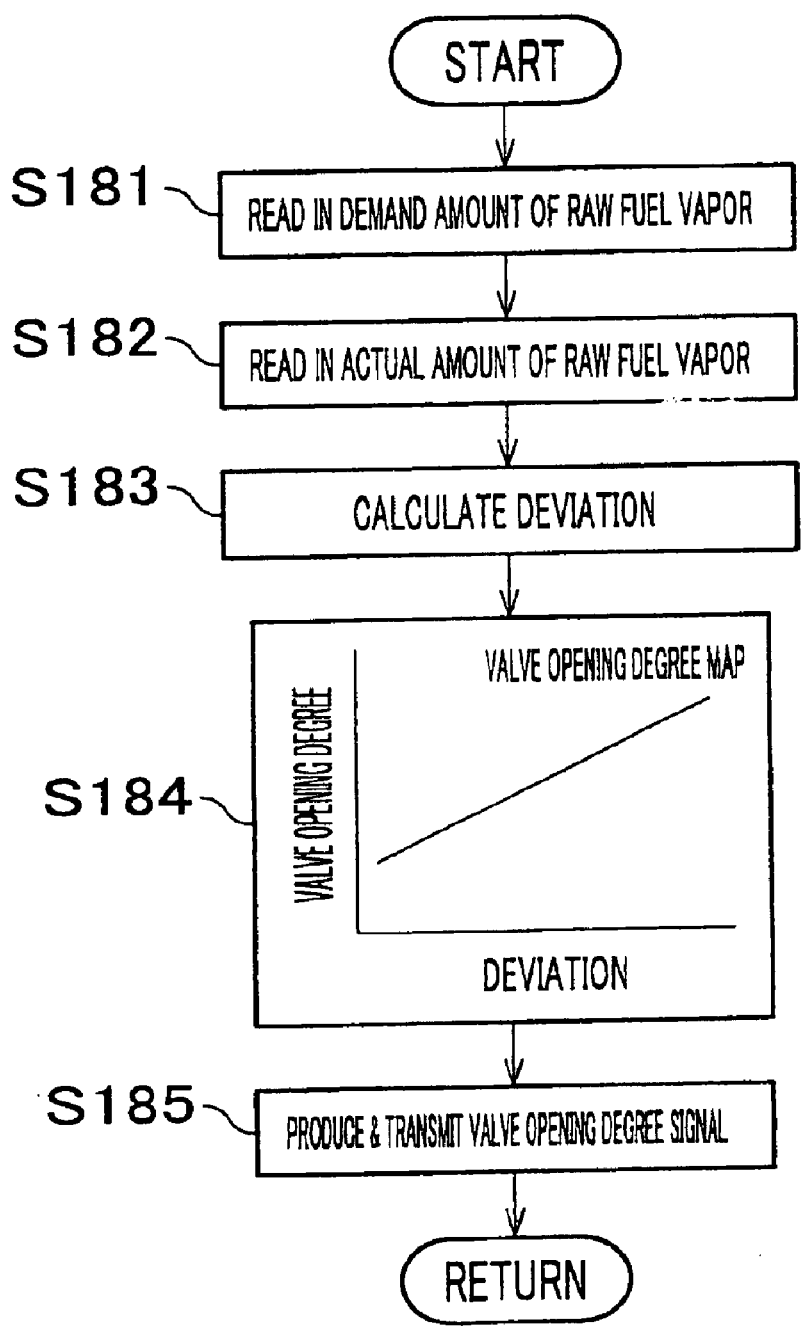
FIG. 5 is a flow chart for controlling introduction of heat transferring gas.
Figure 6:
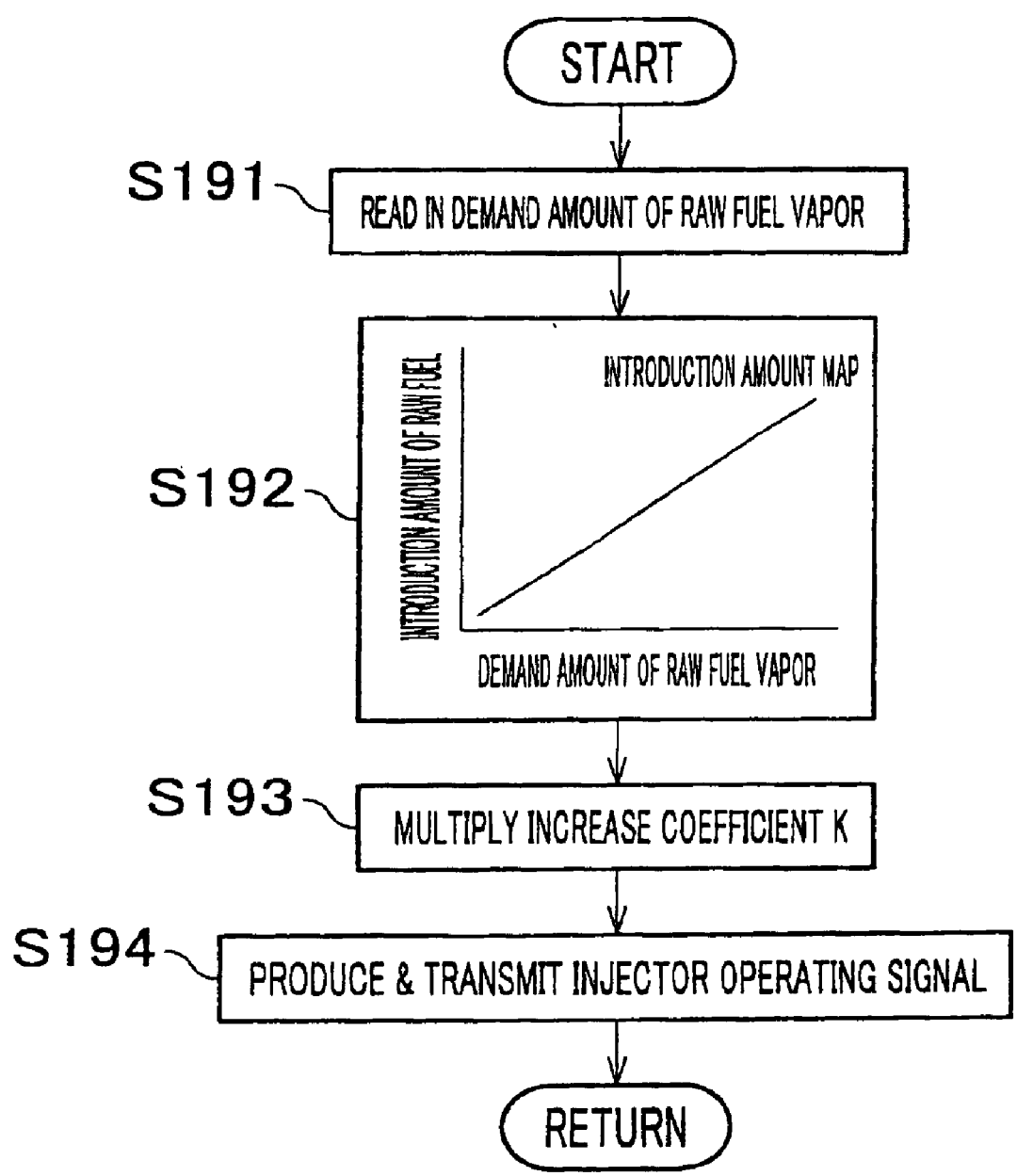
FIG. 6 is a flow chart for controlling incremental introduction of raw fuel.

FIG. 3 is a flow chart (main routine) for controlling introduction of raw fuel and introduction of heat transferring gas. FIG. 4 is a flow chart for controlling introduction of raw fuel in normal operation (normal routine for raw fuel introduction). FIG. 5 is a flow chart for controlling introduction of heat transferring gas (heat transferring gas introduction routine) FIG. 6 is a flow chart for controlling incremental introduction of raw fuel (raw fuel incremental introduction routine).

Main Routine

With reference to the flow chart of FIG. 3 (main routine), a description will be given of the instance where the control unit CU controls introduction of heat transferring gas into the catalyst combustor 11 and the instance where the control unit CU controls introduction of raw fuel into the vaporizer 12.

The main routine shown in FIG. 3 is repeated, for example, at intervals of 20 milliseconds.

During operation, the control unit CU reads in the demand amount of raw fuel (target value of the amount of vapor) (S11) The demand amount of raw fuel vapor is calculated by a computer other than the control unit CU. The control unit CU calculates the increased output on the basis of the difference between the demand amount of raw fuel vapor that is presently read in and the previous demand amount of raw fuel vapor that has previously been read in, and determines whether the increased output is equal to greater than a predetermined amount (S12, S13). On this determination, if the increased output is less than the predetermined amount (No), then the normal routine for raw fuel introduction is carried out (S14). Namely, the heat transferring gas introduction routine at step S18 and the raw fuel incremental introduction routine at step S19 are skipped, which means that since the increased output is small, raw fuel can be vaporized without introducing heat transferring gas into the catalyst combustor 11. Furthermore, there is no need to increase the introduction of raw fuel (ref. the tenth aspect of the invention) if the increased output is small. It only requires normal operation to increase or decrease the amount of raw fuel.

Subsequently, the control unit CU determines whether the process should be completed (S15), and if Yes, the control unit CU completes the process, and if No, then returns to step S11 to continue the process. Completing the process includes a case where the raw fuel vaporizing apparatus 1 stops operation.

The normal routine for raw fuel introduction, the heat transferring gas introduction routine, and the raw fuel incremental introduction routine will be described later with reference to FIGS. 4 to 6, respectively.

Meanwhile, in step S13, if the increased output is equal to or greater than the predetermined amount (Yes), the control unit CU starts to read in the temperature of the catalyst and determines whether the temperature of the catalyst is greater than the lower limit temperature (S16, S17). In step S17, if the temperature of the catalyst (temperature of the catalyst combustor 11) is equal to or lower than the lower limit temperature (No), catalytic combustion may be terminated by introducing heat transferring gas into the catalyst combustor 11. For this reason, the operation proceeds to step S14 to skip steps S18 and S19. The instance "if the increased output is equal to or greater than the predetermined amount (Yes)" corresponds to the condition "if the amount of vapor to be increased is equal to or greater than a predetermined amount" defined in the second aspect of the invention.

On the contrary, in step S17, if the temperature of the catalyst is greater than the lower limit temperature (Yes), the heat transferring gas introduction routine and the raw fuel incremental introduction routine are carried out (S18, S19). The reason why the heat transferring gas introduction routine is carried out is that heat retained by the catalyst combustor 11 is led to the vaporizer 12 as high temperature gas to enhance the raw fuel vaporizing capacity of the vaporizer 12. And the reason why the raw fuel incremental introduction routine is carried out is to minimize the difference between the demand amount of raw fuel vapor and the actual amount of raw fuel vapor.

After carrying out step S18 and stet S19, the temperature of the catalyst is again read in (S20). The control unit CU then determines, on the basis of the temperature of the catalyst that is presently read in and the previous temperature of the catalyst that has previously been read in, whether the temperature changing value of the catalyst ($° C./sec^2$) increases (S21). If the temperature changing value has not increased (No), it can be considered that a supply of fuel has not been increased in the catalyst combustor 11 or the increased amount of fuel is not sufficient. Therefore, in order to continue the operation, the control unit CU reads in the actual amount of raw fuel vapor from the flow meter F and determines whether the actual amount of raw fuel vapor is equal to or greater than the demand amount of raw fuel vapor (S22, S23) . In step S23, if the demand amount of raw fuel vapor is less than the actual amount of raw fuel vapor (No), the operation proceeds to step S17 to continue the process. As described later, the demand amount of raw fuel vapor in step S23 is the same as that used in the raw fuel incremental introduction routine.

Meanwhile, if the temperature changing value of the catalyst has increased in step S21 (Yes) or if the actual amount of raw fuel vapor is equal to or greater than the demand amount of raw fuel vapor in step S23, the introduction of heat transferring gas is stopped (S24, valve opening degree of zero is set) . A valve opening degree signal for closing the regulating valve V1 is then produced and transmitted to the regulating valve V1 (S25). And the introduction of heat transferring gas is stopped. Subsequently, the operation proceeds to step S15.

Because of the following reasons, the introduction of heat transferring gas is stopped on the basis of the determination at step S21 when the temperature changing value of the catalyst increases (Yes) . Namely, it may be considered that the temperature changing value of the catalyst increases while heat transferring gas is being introduced because the introduction of fuel into the catalyst combustor 11 has been increased. Furthermore, since introducing heat transferring gas is required to overcome drawbacks resulting from a delay in increasing the amount of fuel introduced into the catalyst combustor 11, there is no need to introduce heat transferring gas into the catalyst combustor 11 if the amount of fuel has been increased sufficiently. For this reason, the introduction of heat transferring gas is stopped.

Normal Routine for Raw Fuel Introduction

With reference to the flow chart of FIG. 4 (normal routine for raw fuel introduction), a description will be given of the normal control of the control unit CU for introducing raw fuel into the vaporizer 12, see FIG. 1 when necessary.

The normal routine for raw fuel introduction shown in FIG. 4 is a subroutine to process the operation in step S14, which is a part of the main routine shown in FIG. 3.

During operation, the control unit CU reads in the demand amount of raw fuel vapor (target value of the amount of vapor) (S141). As mentioned above, the demand amount of raw fuel vapor is calculated by a computer other than the control unit CU. Subsequently, the control unit sets the introduction amount of raw fuel that satisfies the demand amount of raw fuel vapor (S142) When setting the introduction amount of raw fuel, the demand amount of raw fuel vapor is multiplied by a predetermined gain, or a map expressing the relation between the demand amount of raw fuel vapor and the introduction amount of raw fuel, such as FIG. 4, is searched. After setting the introduction amount of raw fuel, an injector operating signal is produced for driving the injector 12b on the basis of the introduction amount of raw fuel and is transmitted to the injector 12b (S143). Thereby, raw fuel is introduced (sprayed) in the vaporizer 12 so as to satisfy the demand amount of raw fuel vapor. Unlike the introduction of fuel into the catalyst combustor 11, the introduction of raw fuel into the vaporizer 12 is carried out against the read-in operation of the demand amount of raw fuel vapor without a delay.

Heat Transferring Gas Introduction Routine

With reference to the flow chart of FIG. 5 (heat transferring gas introduction routine), a description will be given of the control of the control unit CU for introducing heat transferring gas into the catalyst combustor 11, see FIG. 1 when necessary.

The heat transferring gas introduction routine shown in FIG. 5 is a subroutine to process the operation in step S18, which is a part of the main routine shown in FIG. 3.

In step S17 of FIG. 3, if the temperature of the catalyst is greater than the lower limit temperature (Yes), the control unit CU reads in the demand amount of raw fuel vapor and the actual amount of raw fuel vapor shown in FIG. 5 (S181, S182) and calculates the deviation (S183). The deviation is defined by the equation "Demand amount of raw fuel vapor—Actual amount of raw fuel vapor". Subsequently, by searching a valve opening degree map, the valve opening degree associated with the deviation is set (S184). The valve opening degree increases with an increase in the deviation. This is because the amount of raw fuel to be vaporized increases with an increase in the deviation, which requires an increase in the amount of heat transferring gas to be introduced.

Subsequently, the valve opening degree signal is produced on the basis of the valve opening degree that has been set and is transmitted to the regulating valve V1 (S185). Accordingly, if the temperature of the catalyst is greater than the lower limit temperature (Yes) in step S17 of FIG. 3, heat transferring gas is supplied to the catalyst combustor 11 in step S18. When heat transferring gas is introduced into the catalyst combustor, heat retained by the catalyst combustor 11 transfers into the vaporizer as the increased amount of high temperature gas derived from the introduced heat transferring gas. Therefore, even if increasing the amount of fuel introduced into the catalyst combustor 11 is delayed against the increased amount of raw fuel introduced into the vaporizer 12, it is possible to ensure the amount of high temperature gas (heat quantity) introduced into the vaporizer 12. Herein, the heat transferring gas is nothing to do with a gas (air) to be introduced into the catalyst combustor 11 for the purpose of activating catalytic combustion, but is a gas introduced into the catalyst combustor 11 mainly for guiding heat that is retained by the catalyst combustor 11 to the vaporizer 12.

After carrying out the steps S181 through S185 shown in FIG. 5, the operation proceeds to step S19 (Return). By this series of processes, even if increasing the amount of fuel for catalytic combustion that is introduced into the catalyst combustor 11 is delayed when a load applied to the vaporizer 12 for vaporizing raw fuel increases (viz., the introduction amount of raw fuel increases), it is possible to increase the amount of high temperature gas introduced from the catalyst combustor 11 into the vaporizer 12. Therefore, smooth vaporization of raw fuel is performed. In other words, by introducing heat transferring gas into the catalyst combustor 11, heat quantity retained by the catalyst combustor 11 can be forcibly converted into high temperature gas and introduced into the vaporizer 12. Therefore, even if increasing the amount of fuel introduced into the catalyst combustor 11 is delayed, it is possible to introduce heat required for vaporizing raw fuel into the vaporizer 12 in a reliable manner, thereby enabling vaporization of raw fuel in good response.

The decreased temperature (retained heat quantity) of the catalyst combustor 11 due to introduction of heat transferring gas is recovered afterward during normal operation or at the time of decreasing the output.

Raw Fuel Incremental Introduction Routine

With reference to the flowchart of FIG. 6 (raw fuel incremental introduction routine), a description will be given of the control of the control unit CU for increasing the amount of raw fuel to be introduced, see FIG. 1 when necessary.

The raw fuel incremental introduction routine shown in FIG. 6 is a subroutine to process the operation in step S19, which is a part of the main routine shown in FIG. 3.

In step S17 of FIG. 3, if the temperature of the catalyst is greater than the lower limit temperature (Yes), after step S18, the control unit CU reads in the demand amount of raw fuel vapor shown in FIG. 6 (S191). Subsequently, by searching an introduction amount map, the control unit CU sets the introduction amount of raw fuel corresponding to the demand amount of raw fuel vapor (S192). This introduction amount map is the same as that of FIG. 4 and is set such that the introduction amount of raw fuel increases with an increase in the demand amount of raw fuel vapor.

Subsequently, in step S193, the introduction amount of raw fuel that is set in step S192 is multiplied by an increase coefficient K to adjust increasingly the introduction amount of raw fuel. The value of the increase coefficient K is stationarily set, for example, 1.1. When the increase coefficient K is 1.1, raw fuel is introduced into the vaporizer 12 with a 10% increase.

Thereafter, an injector operating signal is produced on the basis of the introduction amount of raw fuel that has been adjusted increasingly, and is transmitted to the injector 12b (S194). Accordingly, if the increased output is equal to or greater than a predetermined amount (step S13 of FIG. 3), the amount of raw fuel is controlled to increase more than a requirement determined by the demand amount of raw fuel vapor as the target value of the amount of vapor, see the tenth aspect of the invention, and raw fuel is introduced into the vaporizer 12.

As sown in FIG. 3, the heat transferring gas introduction routine (S18) and the raw fuel incremental introduction routine (S19) are carried out as a set. Cooperating introduction of heat transferring gas and incremental introduction of raw fuel prevents formation of liquid pools of raw fuel within the vaporizer 12 and ensures good response to produce raw fuel vapor.

Figure 7A:
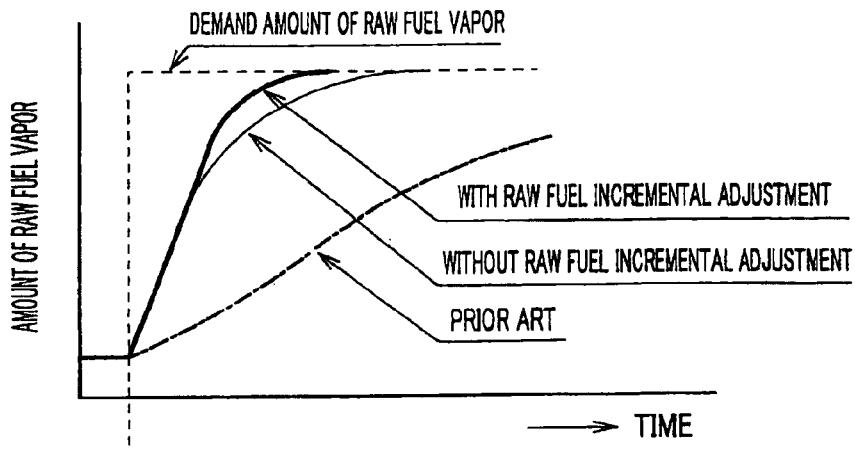
FIG. 7A is a graph schematically explaining an effect after heat transferring gas is processed with a raw fuel incremental adjustment.

By carrying out the control in accordance with the flow charts of FIGS. 3 through 6, it is possible to ensure the amount of raw fuel vapor (actual amount of raw fuel vapor) that highly satisfies the demand mount of raw fuel vapor, as illustrated in FIG. 7A.

FIG. 7A is a graph schematically explaining an effect after heat transferring gas is processed with a raw fuel incremental adjustment by the axis of abscissas indicative of time and the axis of ordinate indicative of the amount of raw fuel vapor. In FIG. 7A, the broken line indicates demand amount of raw fuel vapor, and the solid line indicates actual amount of raw fuel vapor (the heavy line and the thin line indicating with and without a raw fuel incremental adjustment, respectively).

With the raw fuel incremental adjustment in accordance with the flow charts of FIGS. 3 through 6, it is possible to provide excellent compliant characteristics relative to the target value, thereby ensuring considerably faithful production of raw fuel vapor against the demand amount of raw fuel vapor as the target value.

In the prior art such as illustrated by the chain line of FIG. 7A, the amount of high temperature gas introduced into the vaporizer 12 becomes insufficient, which causes a considerable shortage of the amount of raw fuel vapor against the demand amount of raw fuel vapor. According to the present invention, with a simple constitution such as to introduce heat transferring gas, exceptional effects can be attained.

Figure 7B:
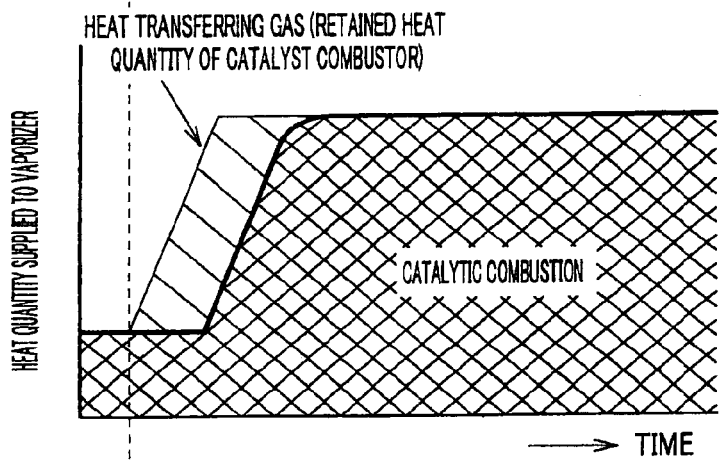
FIG. 7B is a graph schematically explaining relation between heat quantity of heat transferring gas with respect to supply heat quantity to a vaporizer (output of heat quantity from the catalyst combustor) and heat quantity of catalytic combustion.

FIG. 7B is a graph schematically explaining relation between heat quantity of heat transferring gas (output of heat quantity from the catalyst combustor 11) with respect to supply heat quantity to the vaporizer 12 and heat quantity of catalytic combustion. It is clear from this figure that the heat quantity of heat transferring gas contributes to vaporization of raw fuel during the initial increase of the output.

Figure 7C:
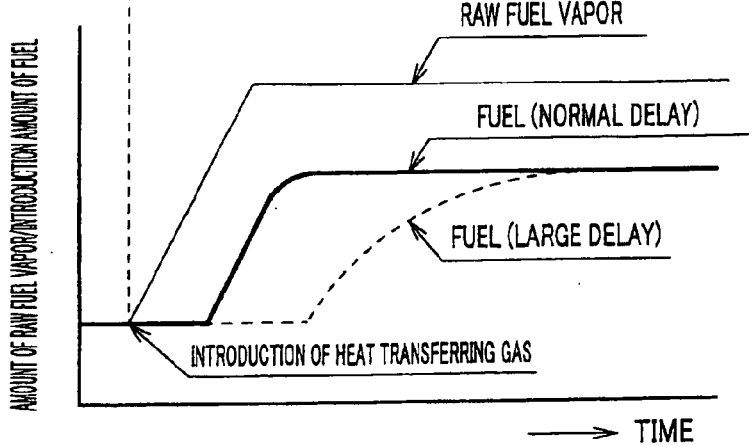
FIG. 7C is a graph illustrating relation between a delay in increasing fuel and introduction of heat transferring gas.

The inventors performed experiments to examine effects if increasing a supply of fuel to the catalyst combustor 11 is delayed further than usual, wherein the timings for introducing heat transferring gas are identical for all the cases. The result is shown in FIG. 7C. As is apparent from this figure, when heat transferring gas is introduced at the same timing, even if increasing a supply of fuel to the catalyst combustor 11 is delayed further than usual (broken line), the amount of raw fuel vapor produced in the vaporizer 12 (thin solid line) is the same as the case with a normal delay. It is to be understood that introducing heat transferring gas into the catalyst combustor 11 compensates drawbacks due to a delay in increasing fuel.

In the case of carrying out the control of FIGS. 3 through 6, after the actual amount of raw fuel vapor reaches the demand amount of raw fuel vapor and when the demand amount of raw fuel vapor is retained, it may be possible to control as follows. That is, after step S25, the control unit CU controls the amount of raw fuel introduced into the vaporizer 12 to be less than a requirement determined by the demand amount of raw fuel vapor, see the eleventh aspect of the invention. With this control, even if liquid pools are formed within the vaporizer 12 by the result of the raw fuel incremental adjustment, it is possible to prevent overshooting of raw fuel vapor that is caused by the liquid pools which are afterwards vaporized. Such a reductive adjustment can be carried out by multiplying a decrease coefficient and the amount of raw fuel obtained from the introduction amount map at step S142 of FIG. 4 during a certain period of time counted, for example, by a timer.

Furthermore, whether or not the raw fuel incremental adjustment process (incremental introduction control of raw fuel) shown in FIG. 6 is carried out, after the actual amount of raw fuel vapor reaches the demand amount of raw fuel vapor, the amount of raw fuel introduced into the vaporizer 12 may be adjusted on the basis of a signal from the flow meter F, see the twelfth aspect of the invention. Such an adjustment may be carried out by instructing the injector 12b to adjust the amount of raw fuel introduced into the vaporizer 12, for example, by a feedback control, after a signal from the flow meter F is inputted into the control unit CU.

Furthermore, instead of determining the timing at which the introduction of heat transferring gas is stopped based on the temperature changing value of the catalyst ($°$ C./sec$^2$), the timing may be determined in such a manner that the amount of heat transferring gas to be introduced is calculated and introduction of heat transferring gas continues until the calculated amount is satisfied. The amount of heat transferring gas may be calculated as follows. That is, the controller calculates the demand heat quantity based on the demand amount of raw fuel vapor, calculates a compulsory heat quantity to be transferred based on the demand heat quantity and combustion heat quantity of the catalyst combustor 11, and then calculates the amount of heat transferring gas, see the third aspect of the invention and FIG. 7B. Also, it is possible to carry out introduction of heat transferring gas after determination of time to be required.

In the case that air (reformed air) is supplied to the vaporizer 12, are formed air supplying line such as illustrated by the phantom line of FIG. 1 maybe employed, and the vaporizer 12 maybe provided with an air introduction nozzle 12c such as illustrated by the phantom line of FIG. 2. Further, in the case of reforming gasoline, the vaporizer 12 may only be supplied with water so that the resulting water vapor is mixed with gasoline vapor that has been vaporized separately.

As to catalytic combustion in the catalyst combustor 11, a purification rate (purification state) of high temperature gas is changed in accordance with the combustion temperature (temperature of the catalyst), and complete combustion of high temperature gas in the catalyst combustor 11 purifies discharged gas from the catalyst combustor 11. Therefore, for the purpose of improving the purification rate of high temperature gas discharged from the catalyst combustor 11, the introduction of heat transferring gas may be controlled in accordance with the purification rate (purification state) of the high temperature gas.

For example, when the combustion temperature lowers, fuel remains unburnt. Therefore, if hydrocarbon is used as fuel, the value of THC (Total Hydrocarbon) within combustion gas discharged from the catalyst combustor increases. If hydrogen is used as fuel, instead of THC, the concentration of hydrogen within combustion gas discharged from the catalyst combustor increases. Namely, the purification rate decreases with a decrease in the temperature during catalytic combustion. In this instance, the purification rate can be improved by controlling the amount of heat transferring gas introduced into the catalyst combustor to increase the temperature during catalytic combustion.

Introduction control of heat transferring gas in consideration of the purification rate (temperature measuring version) is achieved simply by taking the purification rate into consideration for the "lower limit temperature" in step S17 of FIG. 3. The "lower limit temperature" in step S17 of FIG. 3 is determined from the view point of preventing the catalytic combustion from being extinguished. Therefore, the "lower limit temperature" is set as a higher value in consideration of the purification rate.

Purification rate may be presumed by measuring the concentration of oxygen within combustion gas discharged from the catalyst combustor. For example, while fuel is burned in the presence of the catalyst at a certain air fuel ratio (ratio of air and fuel), if the concentration of oxygen within the combustion gas discharged from the catalyst combustor increases, the purification rate decreases. Since combustion is not performed properly, oxygen and fuel remain unused, thereby leading to inevitable decrease in the purification rate.

Therefore, when the control is carried out in consideration of the purification rate (oxygen concentration measuring version), a general oxygen concentration sensor for detecting the concentration of oxygen within high temperature gas is provided at downstream of the catalyst combustor 11 of FIG. 1 so as to detect the concentration of oxygen within high temperature gas while considering the amount of air introduced into the catalyst combustor. And when the detected value becomes higher, the introduction of heat transferring gas is restricted. This can be achieved by carrying out reading in the concentration of oxygen in step S16 of FIG. 3 and modifying step S17 as "the concentration of oxygen is greater than the upper limit concentration".

Accordingly, by controlling the introduction of heat transferring gas in consideration of the purification rate, fuel consumption and environment with respect to the catalyst combustor 11 can be considered.

The purification rate is given by the following equation.

Purification rate $(\%) = (A-B)/A \times 100$

Wherein A: the amount of fuel at the inlet of the catalyst combustor, and B: the amount of unburnt fuel at the outlet of the catalyst combustor 11.

Second Embodiment

A second embodiment of a raw fuel vaporizing apparatus (raw fuel vaporizing method) will be described.

This second embodiment also refers to one embodiment of a fuel cell system equipped with the raw fuel vaporizing apparatus. Parts similar to those previously described with reference to the first embodiment are referred to the figures illustrating the first embodiment and are denoted by the same reference numerals, and detailed description thereof will be omitted.

Figure 8:
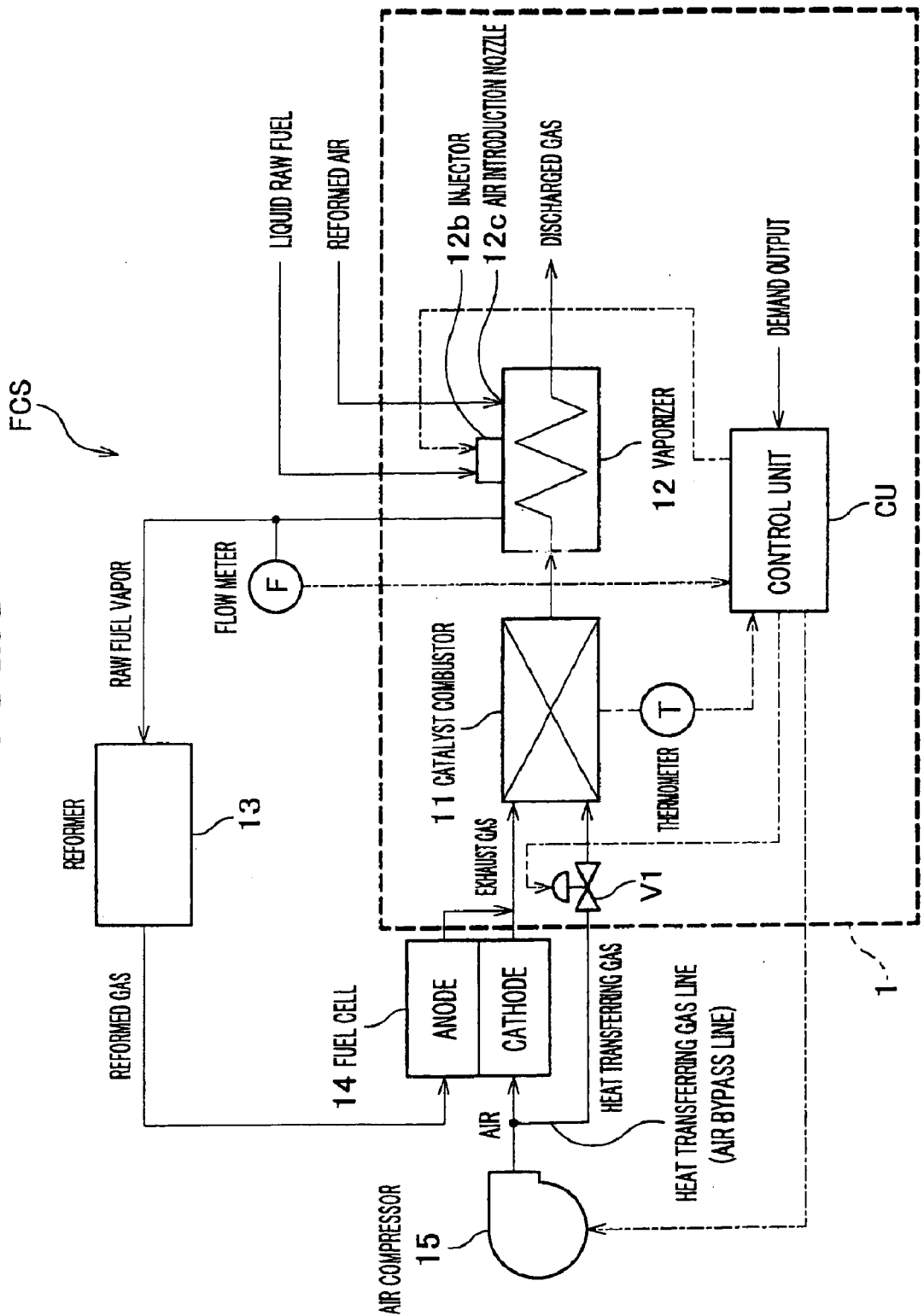
FIG. 8 is a block diagram illustrating a raw fuel vaporizing apparatus (fuel cell system) according to a second embodiment of the invention.

FIG. 8 is a block diagram illustrating a raw fuel vaporizing apparatus (fuel cell system) according to the second embodiment of the invention.

As shown in FIG. 8, the fuel cell system FCS comprises a catalyst combustor 11, a vaporizer 12, a reformer 13, a fuel cell 14, an air compressor 15, a control unit CU, etc. A vehicle is equipped with this fuel cell system FCS. The vaporizer 12 and the reformer 13 serve as a fuel introducing device for the catalyst combustor 11. The air compressor 15 serves as an air introducing device and a heat transferring gas introducing device for the catalyst combustor 11 as well as an air introducing device for the fuel cell 14. Further, the fuel cell 14 corresponds to hydrogen utilizing equipment.

In the fuel cell system FCS shown in FIG. 8, raw fuel (mixture of methanol and water) and reformed air are supplied to the vaporizer 12, and the fuel cell system FCS performs the process of vaporizing raw fuel into raw fuel vapor with the use of heat generated in the catalyst combustor 11, the process of reforming the resulting raw fuel vapor in the reformer 13 to prepare reformed gas, and the process of generating electricity in which the reformed gas and air from the air compressor 15 are supplied to the fuel cell 14. The catalyst combustor 11 is supplied with exhaust gas discharge from the fuel cell 14 (anode exhaust gas plus cathode exhaust gas) and generates heat.

Since exhaust gas discharged from the fuel cell 14 is used as fuel for the catalyst combustor 11, a lead time arises due to the system volume of the reformer 13 or the fuel cell 14. To be specific, increasing the amount of fuel gas (exhaust gas) introduced into the catalyst combustor 11 is delayed against the increased amount of raw fuel introduced into the vaporizer 12. Therefore, when the amount of raw fuel vapor has to be increased, the amount of fuel introduced into the catalyst combustor 11 is shortened (viz., heat quantity introduced into the vaporizer 12 is shortened).

Respective equipment of the fuel cell system FCS will be described later.

The catalyst combustor 11 is the same as that used in the first embodiment. However, exhaust gas from the fuel cell 14 (exhaust gas mixed with anode exhaust gas and cathode exhaust gas) that contains unreacted hydrogen and oxygen is used as fuel and air for catalytic combustion.

The vaporizer 12 is equipped with an air introduction nozzle 12c as illustrated in the broken line of FIG. 2, and is constituted such that reformed air is supplied from an unshown reformed air supplying device to the vaporizer 12 through the air introduction nozzle 12c. Reformed air introduced from the air introduction nozzle 12c into the interior of the vaporizer 12 forms a swirl flow. Raw fuel vapor has the composition mixed with raw fuel and reformed air.

The reformer 13 is a reactor to produce hydrogen-rich reformed gas from raw fuel vapor mixed with methanol vapor, water vapor, and air in the presence of a catalyst for auto thermal reaction. The reformer 13 is equipped with an unshown CO remover to remove CO from reformed gas.

The fuel cell 14 is a polymer electrolyte fuel cell with a structure having several hundreds of unshown single cells laminated each other. The fuel cell 14 is supplied with reformed gas at the anode (hydrogen pole) and air at the cathode to produce electricity by an electrochemical reaction between hydrogen within the reformed gas and oxygen within the air. The produced electricity is supplied to loads, such as an unshown driving motor, the air compressor 15, a car air-conditioner, etc.

The air compressor 15 is a supercharger driven by an unshown motor. Air compressed by the air compressor 15 is supplied to the catalyst combustor 11 as heat transferring gas through the regulating valve V1 as well as to the cathode of the fuel cell 14.

Likewise the first embodiment, the control unit CU controls the introduction of raw fuel through the injector 12b and the introduction of heat transferring gas through the regulating valve V1. According to the second embodiment, a supply of air to the fuel cell 14 (cathode) is controlled by the air compressor 15.

Air Supplying Routine

With reference to the flow chart of FIG. 9, an air supply routine to the fuel cell 14 will be described, see FIG. 8 when necessary.

Figure 9:
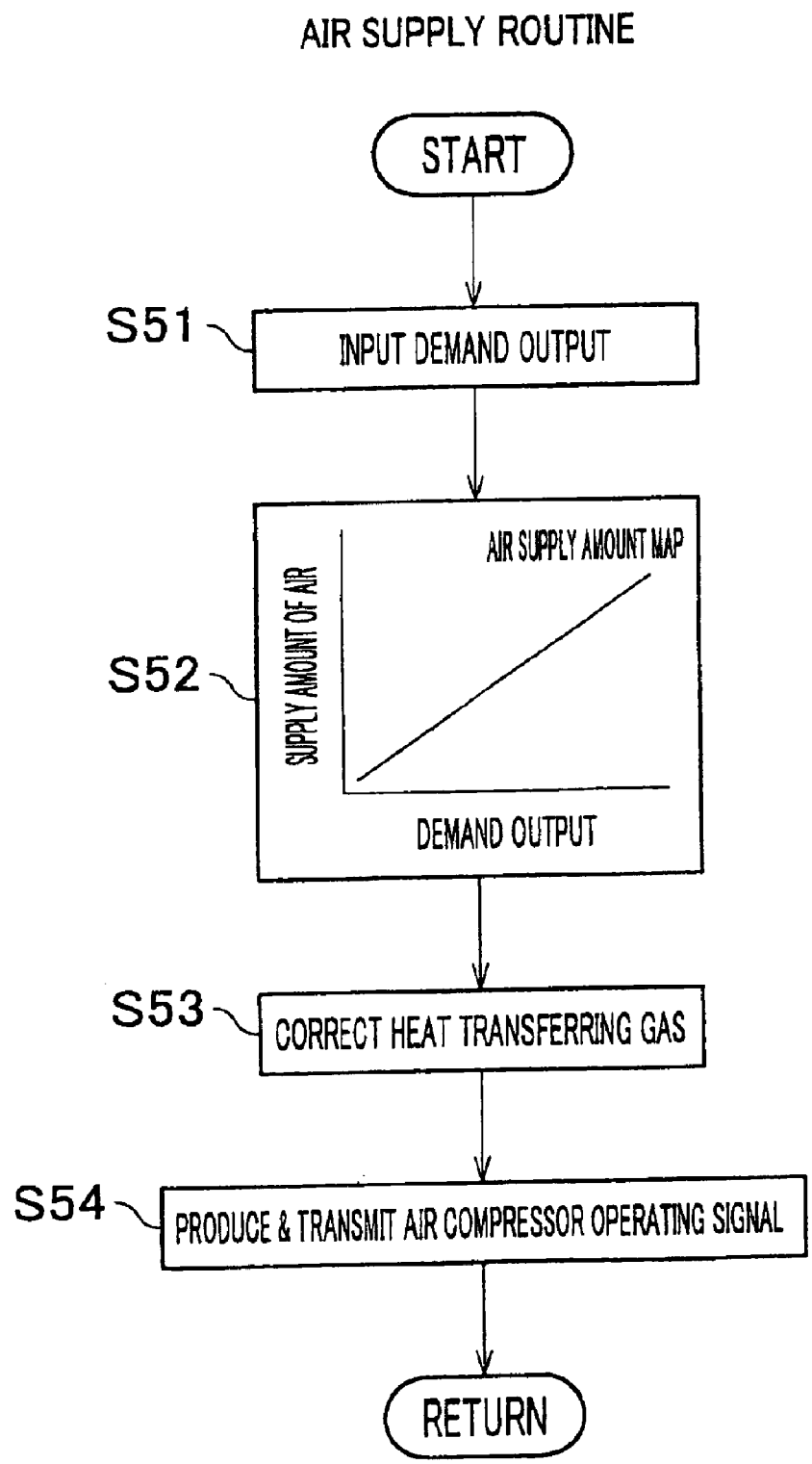
FIG. 9 is a flow chart illustrating an air supply routine to a fuel cell.

FIG. 9 is a flow chart illustrating the air supply routine to the fuel cell.

The air supply routine shown in FIG. 9 is repeated, for example, at intervals of 20 milliseconds.

The control unit CU firstly inputs the demand output with respect to the fuel cell 14 (S51). The demand output is calculated by a computer other than the control unit CU in such a manner that on the basis of the accelerator opening degree signal and the like the computer sets electric power to be supplied to the driving motor, electric power to be supplied to the accessories, etc. When the demand output is inputted, the supply amount of air associating with the demand output is set based on the air supply amount map (S52). In this embodiment, the air compressor 15 also serves as the heat transferring gas supplying device, see the eighth and fifteenth aspects of the invention. For this reason, when heat transferring gas is introduced into the catalyst combustor 11, the amount of air supplied to the fuel cell 14 is shortened. Accordingly, a correction is carried out in step S53 as compensation of heat transferring gas. And in step S54, an air compressor operating signal is produced on the basis of the supply amount of air, and is transmitted to the air compressor 15.

Accordingly, the air compressor 15 supplies an appropriate amount of air to the cathode of the fuel cell 14 in accordance with the demand output. In the case that the air compressor 15 also serves as the reformed air supplying device, such a correction may be carried out, for example, in step S53.

The control unit CU controls the introduction of raw fuel conforming with the first embodiment, the introduction of heat transferring gas, and the incremental introduction of raw fuel, see FIG. 3. However, the amount of reformed air introduced into the vaporizer 12 is set proportionally to the amount of introduced raw fuel. The demand amount of raw fuel vapor in each control process is set based on the demand output to the fuel cell 14.

Operation of Fuel Cell System

With reference to the time chart of FIGS. 10A through 10C, operation of the fuel cell system FCS will be described on the assumption that the fuel cell system FCS is adapted for use in a fuel cell powered vehicle, see FIG. 8 when necessary.

Figure 10A:
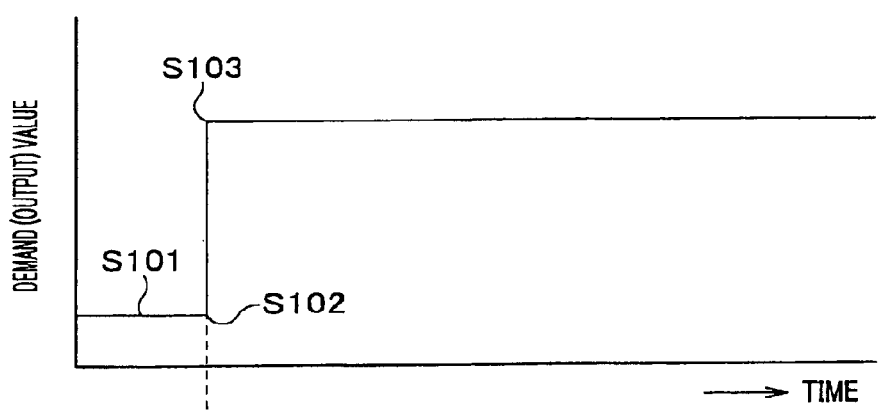
FIG. 10A is a time chart illustrating increase/decrease of demand (output) value in the raw fuel vaporizing apparatus of FIG. 8.
Figure 10B:
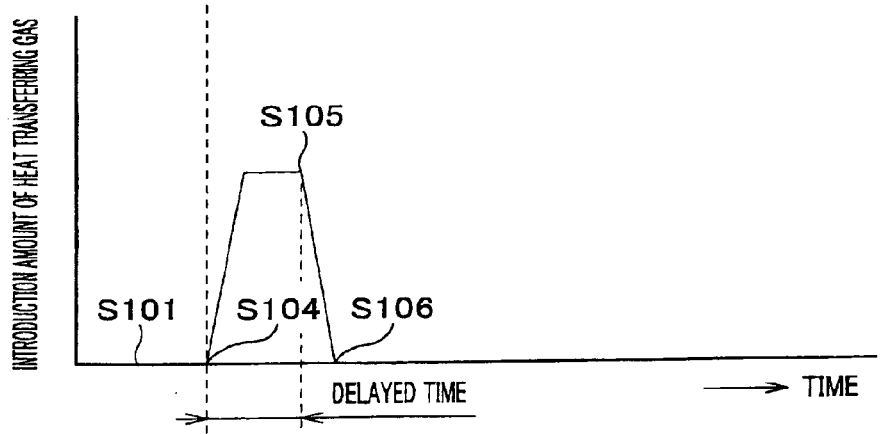
FIG. 10B is a time chart illustrating increases/decrease of the amount of heat transferring gas introduced.
Figure 10C:
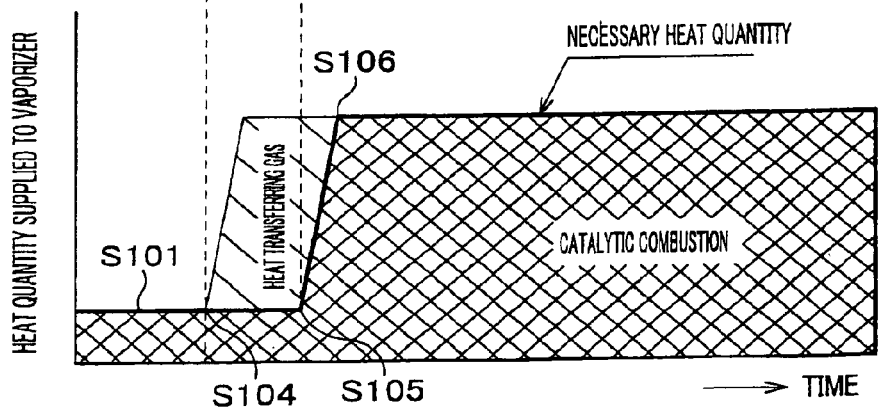
FIG. 10C is a time chart illustrating increase/decrease of the amount of heat quantity supplied to the vaporizer.

FIG. 10A is a time chart illustrating increase/decrease of the demand (output) value, FIG. 10B is a time chart illustrating increases/decrease of the amount of heat transferring gas introduced, and FIG. 10C is a time chart illustrating increase/decrease of the amount of heat quantity supplied to the vaporizer.

In step S101, the driver is cruising the vehicle at a constant speed with a small output (load) of the fuel cell 14. In this circumstance, heat quantity required for vaporizing raw fuel is obtained because the catalyst combustor 11 burns exhaust gas discharge from the fuel cell 14 in the presence of the catalyst. The driver then abruptly depresses the accelerator pedal and retained the accelerator pedal in the depressed position. Therefore, the demand output abruptly rises and is retained in a higher value (S102, S103).

The control unit CU carries out calculation of the demand amount of raw fuel vapor on the basis of the demand output that has been inputted, calculation of the demand heat quantity, calculation of the compulsory heat quantity to be transferred on the basis of the demand heat quantity and the combustion heat quantity of the catalyst combustor 11, and calculation of the amount of heat transferring gas on the basis of the compulsory heat quantity (such operations differs from those shown in the flow chart of FIG. 5). And heat transferring gas is introduced into the catalyst combustor 11 on the basis of the calculated amount of heat transferring gas (S104). Heat quantity required for vaporizing raw fuel is then transferred from the catalyst combustor 11 to the vaporizer 12, and at the same time, a supply of raw fuel to the vaporizer 12 is increased so as to satisfy the demand amount of raw fuel vapor. In this event, since heat is supplied to the vaporizer 12 by the introduction of heat transferring gas, even if heat quantity of the catalytic combustion is insufficient, it is possible to vaporize the increased amount of raw fuel sufficiently.

When the amount of raw fuel vapor increases, the amount of reformed gas produced by the reformer 13 and the amount of exhaust gas (return gas) discharged from the fuel cell 14 are in turn increase. Since exhaust gas is used as fuel for the catalyst combustor 11, heat quantity resulting from catalytic combustion increases with a certain delay that is caused by the system volume of the fuel cell system FCS (and time required for operation of each process) and is supplied to the vaporizer 12 as high temperature gas (S105). Meanwhile, if heat quantity resulting from the catalytic combustion increases, necessary heat quantity illustrated in FIG. 10C may be overshot. Thereby, the control unit CU decreases the amount of heat transferring gas to be introduced. And when a sufficient amount of exhaust gas is introduced into the catalyst combustor 11, the introduction of heat transferring gas into the catalyst combustor 11 is stopped (S106). Raw fuel introduced into the vaporizer 12 is thereafter vaporized by introducing heat resulting from catalytic combustion with the introduction of exhaust gas.

A supply of heat transferring gas is gradually decreased from the step S105 to the step S106 of FIG. 10B to prevent overshooting of necessary heat quantity as shown in FIG. 10C. However, this process can be achieved as follows.

For example, (1) Measuring the temperature changing value of the catalyst in the catalyst combustor 11 with a thermometer T, and at the same time, measuring the flow rate of fuel gas (exhaust gas from the fuel cell 14) introduced into the catalyst combustor 11 with an unshown flow meter. And with S105 considered as the rising point of the temperature changing value of the catalyst, the introduction of heat transferring gas is decreased in accordance with the increased amount of exhaust gas.

Or (2) Measuring the temperature changing value of the catalyst in the catalyst combustor 11 with a thermometer T, and at the same time, storing in a memory of the control unit CU the increasing gradient of the demand output from the step S102 to the step S103 of FIG. 10A. And with S105 considered as the rising point of the temperature changing value of the catalyst, the introduction of heat transferring gas is decreased in accordance with the increasing gradient of the demand output such that the greater the gradient is, the shorter the time for the gradual decrease processing is, and the smaller the gradient is, the longer the time for the gradual decrease processing is. In this instance, it is preferable that the time for the gradual decrease processing does not have 0 sec. This is because, unlike the increase in the demand output from the step S102 to the step S103 of FIG. 10A, exhaust gas does not increase instantly.

As mentioned above, by adapting the raw fuel vaporizing apparatus 1 to the fuel cell system FCS, even if increasing a supply of fuel (exhaust gas) to the catalyst combustor 11 is delayed against the increased amount of raw fuel introduced into the vaporizer 12, the increased amount of raw fuel is vaporized in good response because of the introduction of heat transferring gas. Heat quantity carried from the catalyst combustor 11 by the introduction of heat transferring gas is recovered during the steady operation or at the time of decreasing the output.

The inventors performed experiments on the fuel cell system FCS equipped with the fuel cell 14 with the maximum output of 60 kw, in which, as examples, the output is increased (a) from 10 kw to 40 kw, (b) from 10 kw to 50 kw, and (c) from 10 kw to 60 kw. As a comparative example, an experiment was performed on the same conditions but without introduction of heat transferring gas. As the result of the experiments, all the examples successfully produced within a few seconds the amount of raw fuel vapor corresponding to the increased output. Meanwhile, the comparative example where introduction of heat transferring gas is not performed takes as three to five times longer as the embodiments. Furthermore, in the case of (c), the comparative example (prior art example) could not produce the amount of raw fuel vapor corresponding to the maximum output. According to the invention, remarkable improvements in the output responsibility and the output itself could be achieved. In other words, advantageous effects of the invention were proved.

Figure 11:
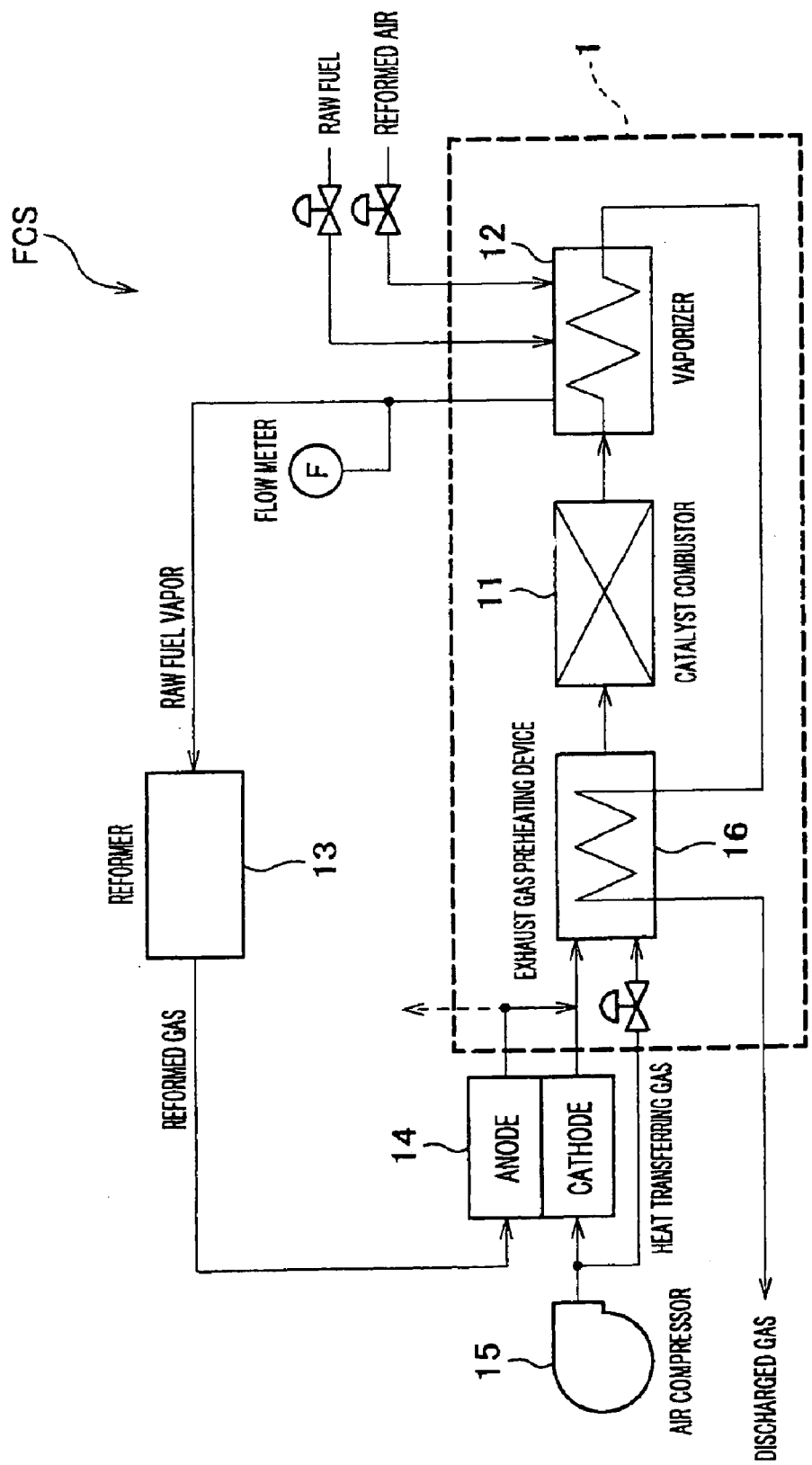
FIG. 11 is a block diagram illustrating a modified embodiment of the fuel cell system.
Figure 12:
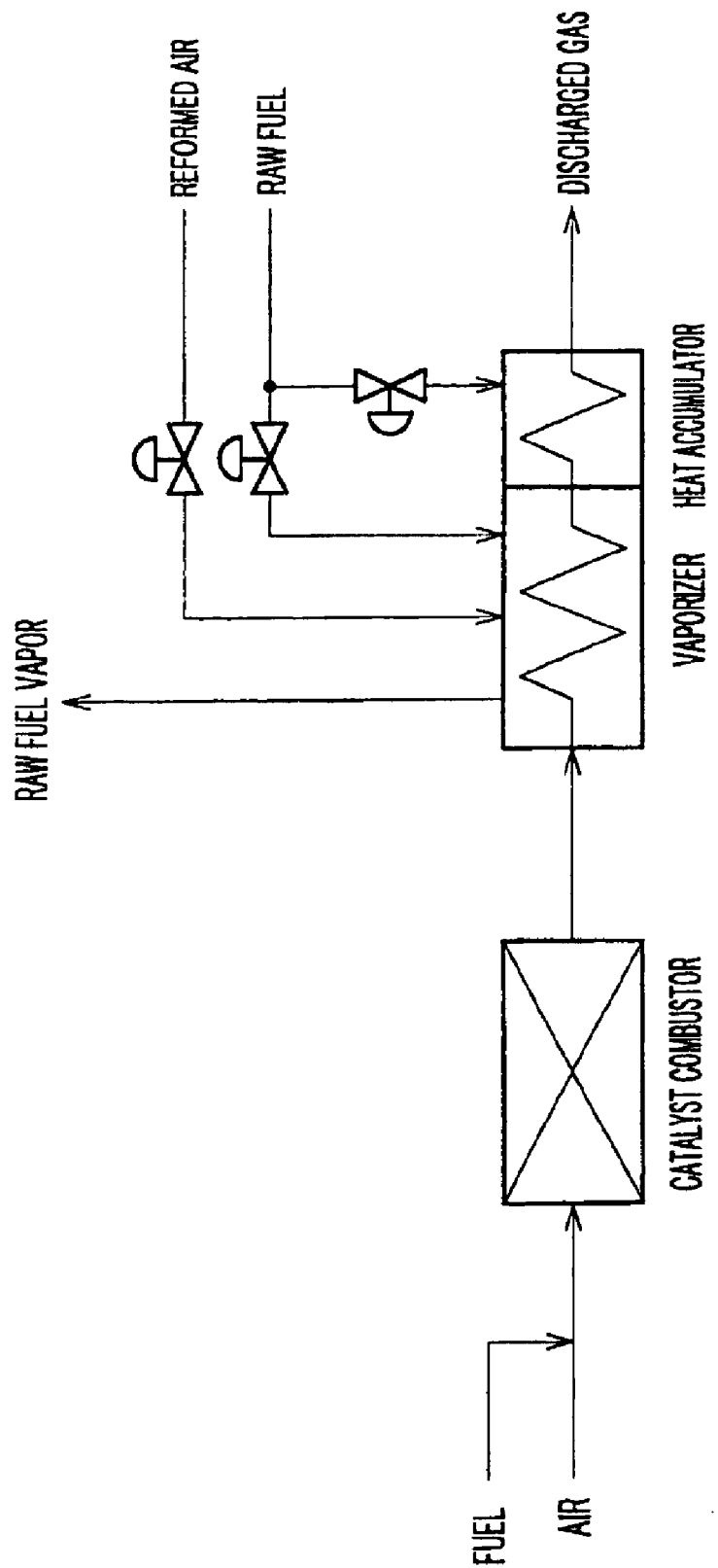
FIG. 12 is a block diagram illustrating a conventional raw fuel vaporizing apparatus.
Figure 13:
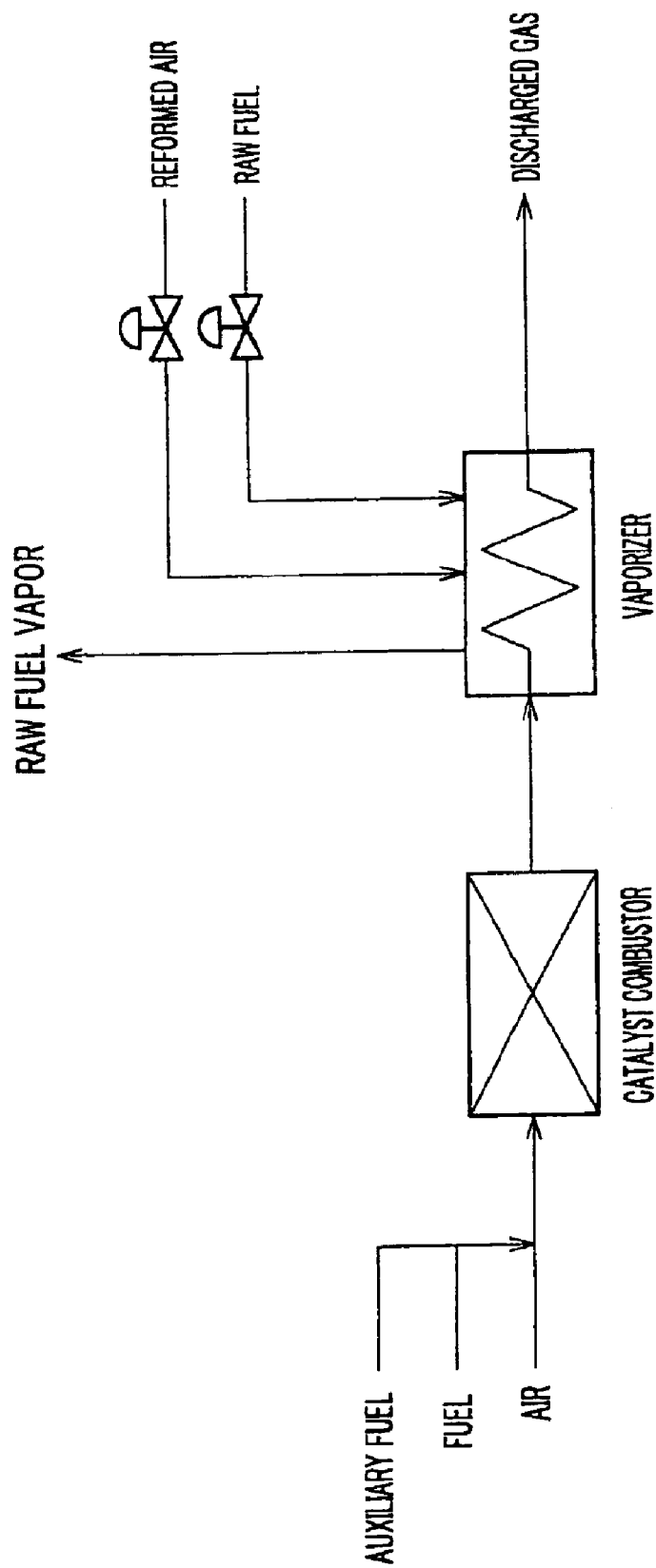
FIG. 13 is a block diagram illustrating a conventional raw fuel vaporizing apparatus.

As shown in FIG. 11, the fuel cell system FCS (raw fuel vaporizing apparatus 1) may be provided with an exhaust gas preheating device 16. Catalytic combustion gas (high temperature gas) that is produced by vaporizing raw fuel in the vaporizer 12 is introduced in to the exhaust gas preheating device 16, and is subject to heat exchange with exhaust gas so as to preheat the exhaust gas. Accordingly, discharged heat can be used effectively. Further, it is possible to assist temperature rise of the catalyst combustor 11 after introduction of heat transferring gas.

Furthermore, according to the fuel cell system FCS described in the second embodiment, the air compressor 15 introduces a part of the compressed air as heat transferring gas into the catalyst combustor 11 bypassing the fuel cell 14 by means of a heat transferring gas line shown in FIG. 8. And exhaust gas discharged from the fuel cell 14 is introduced into the catalyst combustor 11 as fuel. However, in place of (or in addition to) this arrangement, cathode exhaust gas from the fuel cell 14 maybe used as heat transferring gas, see the seventeenth aspect of the invention.

Prior art techniques referred in the background of the invention may be adapted in combination, if necessary.

Furthermore, in the aforementioned embodiment, the actual amount of raw fuel vapor is measured with the flow meter F arranged downstream of the vaporizer 12. However, a map of the injection amount of raw fuel and the amount of raw fuel vapor may be prepared such that, with the use of the map, the actual amount of raw fuel vapor is presumed by measuring a flow rate at the raw fuel injection side (liquid side) or an injection command at the injector 12b.

As mentioned above, the present invention is not limited to the specific first and second embodiments, and various changes and modifications may be made within the scope of the invention as hereinafter claimed.

What is claimed is:

1. A raw fuel vaporizing apparatus comprising:
    a vaporizer for vaporizing liquid raw fuel;
    a raw fuel introducing device for introducing the liquid raw fuel into the vaporizer;
    a catalyst combustor into which fuel and air are supplied for catalytic combustion, the catalyst combustor generating heat in the presence of a catalyst and supplying the resulting heat to the vaporizer so as to vaporize the liquid raw fuel;
    a fuel introducing device for introducing the fuel into the catalyst, combustor;
    an air introducing device for introducing the amount of the air suitable for catalytic combustion into the catalyst combustor;
    a heat transferring gas introducing device introducing heat transferring gas into the catalyst combustor so as to transfer heat retained by the catalyst combustor to the vaporizer; and
    a controller increasing the amount of the heat transferring gas through the heat transferring gas introducing device when a demand amount of vapor to be generated in the vaporizer is increased.

2. A raw fuel vaporizing apparatus according to claim 1, wherein said controller increases the amount of the heat transferring gas through the heat transferring gas introducing device if the increase in the demand amount of vapor is equal to or greater than a predetermined amount.

3. A raw fuel vaporizing apparatus according to claim 1, wherein said controller calculates a demand heat quantity based on a target value of the increased demand amount of vapor, calculates a compulsory heat quantity to be transferred based on the demand heat quantity and a combustion heat quantity of the catalyst combustor, and determines the amount of the heat transferring gas based on the compulsory heat quantity.

4. A raw fuel vaporizing apparatus according to claim 1, wherein said controller restricts the introduction of the heat transferring gas through the heat transferring gas introducing device if the amount of the heat transferring gas is more than a predetermined threshold value.

5. A raw fuel vaporizing apparatus according to claim 1, wherein said controller restricts the introduction of the heat transferring gas through the heat transferring gas introducing device if a temperature of the catalyst combustor is lower than a catalytic combustion maintaining temperature as a result of the introduction of the heat transferring gas.

6. A raw fuel vaporizing apparatus according to claim 1, wherein said controller restricts the introduction of the heat transferring gas in accordance with a purification state by combustion of combustion gas in the catalyst combustor.

7. A raw fuel vaporizing apparatus according to claim 1, wherein said catalyst combustor comprises a honeycomb-shaped carrier on which a catalyst is supported.

8. A raw fuel vaporizing apparatus according to claim 1, wherein said air introducing device and said heat transferring gas introducing device are provided by a single device which introduces air as the heat transferring gas.

9. A raw fuel vaporizing apparatus according to claim 1, wherein said controller restricts the introduction of the heat transferring gas through the heat transferring gas introducing device if a temperature changing value of the catalyst combustor increases positively at the time the fuel introducing device increases the amount of the fuel introduced into the catalyst combustor.

10. A raw fuel vaporizing apparatus according to claim 1, wherein when the heat transferring gas introducing device carries out the introduction of the heat transferring gas, said controller controls the amount of the raw fuel to be introduced into the vaporizer through the raw fuel introducing, device such that before an actual amount of raw fuel vapor reaches a target value of the increased demand amount of vapor, the amount of the raw fuel increases more than a requirement determined by the target value.

11. A raw fuel vaporizing apparatus according to claim 1, wherein said controller controls the amount of the raw fuel through the raw fuel introducing device such that after an actual amount of raw fuel vapor reaches a target value of the increased demand amount of vapor and when the target value is retained, the amount of the raw fuel decreases equal to or lower than a requirement determined by the target value.

12. A raw fuel vaporizing apparatus according to claim 1, wherein after an actual amount of raw fuel vapor reaches a target value of the increased demand amount of vapor, said controller receives a signal from a vapor amount measuring device provided downstream of the vaporizer, and controls the amount of the raw fuel to be introduced into the vaporizer through the raw fuel introducing device.

13. A method of vaporizing raw fuel, wherein high temperature gas generated in a catalyst combustor into which fuel and air are introduced for catalytic combustion is introduced into a vaporizer so as to vaporize liquid raw fuel introduced into the vaporizer, the method comprising:

continuously introducing part of or the whole remaining gas vaporized in the vaporizer and reformed but unused in hydrogen utilizing equipment into the catalyst combustor as the fuel; and increasing the amount of the high temperature gas by increasing the amount of the air to be introduced into the catalyst combustor if a demand amount of vapor to be generated in the vaporizer is increased.

14. A method of vaporizing raw fuel, wherein high temperature gas generated in a catalyst combustor into which fuel and air are supplied for catalytic combustion is introduced into a vaporizer so as to vaporize liquid raw fuel introduced into the vaporizer, the method comprising:

increasing the amount of the high temperature gas by increasing the amount of the air to be introduced into the catalyst combustor when a demand amount of raw fuel vapor to be generated by vaporizing the liquid raw fuel is increased and if increasing the introduction of the fuel into the catalyst combustor is delayed against the increased amount of the raw fuel introduced into the vaporizer.

15. A fuel cell system comprising:

a raw fuel vaporizing apparatus of claim 1;

a reformer supplied with raw fuel vapor generated in the raw fuel vaporizing apparatus and producing hydrogen-rich reformed gas; and a fuel cell supplied with the reformed gas generated in the reformer and air and producing electricity;

wherein the heat transferring gas introducing device also serves as an air supplying device for supplying air to the fuel cell, and the fuel introducing device introduces into the catalyst combustor exhaust gas containing hydrogen discharged from the fuel cell.

16. A fuel cell system according to claim 15, wherein said heat transferring gas introducing device introduces into the catalyst combustor exhaust gas discharged from the fuel cell.

17. A fuel cell system according to claim 15, wherein said controller restricts the amount of the heat transferring gas through the heat transferring gas introducing device if a temperature changing value of the catalyst combustor increases positively at the time a supply of the fuel to the catalyst combustor increases due to the introduction of the exhaust gas.

* * * * *